(12) United States Patent
Nishi

(10) Patent No.: US 8,323,776 B2
(45) Date of Patent: Dec. 4, 2012

(54) COMPOSITE FERRITE SHEET, METHOD OF FABRICATING THE COMPOSITE FERRITE SHEET, AND ARRAY OF SINTERED FERRITE SEGMENTS USED TO FORM THE COMPOSITE FERRITE SHEET

(75) Inventor: Ikuo Nishi, Joetsu (JP)

(73) Assignee: Maruwa Co., Ltd., Owariasahi-Shi (JP)

( * ) Notice: Subject to any disclaimer, the term of this patent is extended or adjusted under 35 U.S.C. 154(b) by 0 days.

(21) Appl. No.: 13/324,262

(22) Filed: Dec. 13, 2011

(65) Prior Publication Data

US 2012/0088070 A1    Apr. 12, 2012

(30) Foreign Application Priority Data

Apr. 8, 2011 (JP) ................................. 2011-086103
Oct. 25, 2011 (JP) ................................. 2011-234355

(51) Int. Cl.
*B32B 3/30* (2006.01)
(52) U.S. Cl. ...................... 428/167; 428/172; 428/542.8
(58) Field of Classification Search .................... 428/43, 428/167, 172, 155, 542.8, 900
See application file for complete search history.

(56) References Cited

U.S. PATENT DOCUMENTS

| 6,379,777 B1 * | 4/2002 | Ota et al. ...................... 428/156 |
| 2009/0220721 A1 | 9/2009 | Matsusaki | |

FOREIGN PATENT DOCUMENTS

| JP | 60-066061 U | 5/1985 |
| JP | 07-326501 A1 | 12/1995 |
| JP | 09-055635 A1 | 2/1997 |
| JP | 09-139555 A1 | 5/1997 |
| JP | 11-008107 A1 | 1/1999 |
| JP | 2001-130948 A1 | 5/2001 |
| JP | 2001-338832 A1 | 12/2001 |
| JP | 2002-223044 A1 | 8/2002 |
| JP | 2004-296713 A1 | 10/2004 |
| JP | 2005-015293 A1 | 1/2005 |
| JP | 2005-201438 A1 | 7/2005 |
| JP | 2008-296431 A1 | 12/2008 |
| JP | 2009-099895 A1 | 5/2009 |
| JP | 2009-182062 A1 | 8/2009 |
| JP | 1368549 | 8/2009 |
| JP | 2010-045120 A1 | 2/2010 |
| WO | 2008/062496 A1 | 5/2008 |

OTHER PUBLICATIONS

Japanese Office Action dated Jan. 24, 2012.
Japanese Notice of Allowance dated Aug. 7, 2012.
Japanese Office Action dated May 15, 2012.

* cited by examiner

Primary Examiner — Donald J Loney
(74) Attorney, Agent, or Firm — Burr & Brown

(57) ABSTRACT

A method of fabricating a composite ferrite sheet including the steps of: (a) forming a grooved green ferrite sheet having a non-intersecting grid pattern by pressing a groove forming die including a plurality of first protrusions and a plurality of second protrusions having a triangular cross sectional shape, each protrusion of at least one of the plurality of first protrusions and the plurality of second protrusions being discontinuous at each imaginary intersecting portion at which extension lines of the respective first and second protrusions intersect each other, (b) firing the grooved ferrite green sheet to obtain a sintered ferrite sheet, (c) bonding at least one supporting sheet to at least one of opposite major surfaces of the sintered ferrite sheet, and (d) rupturing the sintered ferrite sheet along the grooves into a multiplicity of separate and independent rectangular planar ferrite segments which are bonded to the supporting sheet.

6 Claims, 20 Drawing Sheets

COMPOSITE FERRITE SHEET, METHOD OF FABRICATING THE COMPOSITE FERRITE SHEET, AND ARRAY OF SINTERED FERRITE SEGMENTS USED TO FORM THE COMPOSITE FERRITE SHEET

The present application is based on Japanese Patent Applications No. 2011-086103 filed on Apr. 8, 2011 and No. 2011-234355 filed on Oct. 25, 2011, the contents of which are incorporated herein by reference.

BACKGROUND OF THE INVENTION

1. Field of the Invention

The present invention relates in general to a composite ferrite sheet, a method of fabricating the composite ferrite sheet, and an array of sintered ferrite segments used for the composite ferrite sheet, and more particularly to a method of advantageously fabricating a flexible composite ferrite sheet which has a planar sintered ferrite layer divided into rectangular segments and which absorbs or blocks external electromagnetic waves incident upon electronic components or electromagnetic waves generated by the electronic components per se, or which is bonded to NFC devices or antenna coils to improve their communication performance or improve performance of non-contact type power transmission devices, and a method of advantageously manufacturing electromagnetic wave absorbing devices using the composite ferrite sheet.

2. Description of Related Art

JP-A-2009-99895 proposes an example of a laminated body that absorbs electromagnetic wave to be installed on an electronic component or an electronic device to absorb electromagnetic waves irradiated therefrom or incident thereupon. The laminated body for absorbing electromagnetic wave includes a planar ferrite layer consisting of a multiplicity of sintered ferrite segments regularly arranged in longitudinal and transverse rows so as to form a lattice structure, and sheet layers supporting the planar ferrite layer. This publication discloses a method of fabricating a laminated structure body by first firing a ferrite green sheet having a multiplicity of dividing grooves formed on its one surface so as to extend longitudinally and transversely, to prepare a sintered ferrite body in the form of a rectangular plate, then bonding a double-coated adhesive tape to one of the opposite surfaces of the sintered ferrite body and a protective tape to the other surface, and subsequently holding the sintered ferrite body in pressing surface contact with a curved surface of a rigid body, to regularly divide the sintered ferrite body longitudinally and transversely into mutually independent segments which are held in contact with each other, whereby the above-described laminated structure is fabricated such that the laminated structure as a whole is flexible.

While the publication discloses that a knife blade is used as means for forming a plurality of dividing grooves that divides the ferrite green sheet into the segments, the publication does not teach a specific manner of forming the dividing grooves in the ferrite green sheet with the knife blade such that the grooves have almost the same depth, and does not teach a manner of forming a multiplicity of dividing grooves at one time. Namely, the publication discloses only the use of the knife blade to form the dividing grooves, but never refers to techniques for improving the accuracy of formation of the plurality of dividing grooves, the efficiency of formation of the plurality of dividing grooves, and the productivity of the grooved ferrite green sheet.

JP-A-2008-296431 discloses a method of fabricating a ceramic sheet having a ceramic layer consisting of a plurality of ceramic segments arranged in a plane, by first forming a plurality of recesses or holes in a sintered ceramic body in the form of a thin plate by a laser beam machining such that the recesses or holes are spaced apart from each other along lines, and then breaking the thin sintered ceramic body along those lines, to obtain the ceramic segments, or by first forming a plurality of recesses or holes in a green ceramic body with blades or a die such that the recesses or holes are spaced apart from each other along lines, then firing the green ceramic body along those lines, to obtain the ceramic segments. However, the process disclosed in this publication requires a timing-consuming and cumbersome operation to form the plurality of recesses or holes along the lines, and accordingly has a potential problem in terms of the productivity of the desired ceramic sheet, and potential risk of difficulty to accurately break the thin sintered ceramic sheet along the lines of the recesses or holes, and generation of minute ceramic pieces upon breaking of the sintered ceramic sheet.

JP-A-2009-182062 discloses a method of fabricating a composite ferrite sheet by forming grooves in a grid pattern in a surface of a ferrite green sheet with a knife device, a laser machining device, or a die, to obtain a grooved ferrite green sheet used to form ferrite segments which constitute the composite ferrite sheet. However, this publication does not teach a specific manner of forming.

Registered Design No. JP1368549 proposes a sintered ferrite sheet to be installed on a wireless communication device to absorb or block electromagnetic waves. Although this publication discloses discontinuous longitudinal and transverse grooves formed in a surface of the sintered ferrite sheet, the publication does not teach a manner of forming the longitudinal and transverse grooves.

SUMMARY OF THE INVENTION

In view of the related art described above, the present inventor made an intensive study of the manner of effectively improving the productivity of a grooved ferrite green sheet and the accuracy of depth of dividing grooves formed in the grooved ferrite sheet (sintered body) used to form the planar ferrite layer of the laminated composite ferrite sheet, which includes at least the planer ferrite layer and the sheet layers supporting the planar ferrite layer, as described above. As a result of the study, the inventor conceived the utilization of a groove forming die 100 shown in FIG. 23, to form dividing grooves in a ceramic sheet which gives a resistor in the form of a chip. This groove forming die 100 has longitudinal groove forming blades 104 and transverse groove forming blades 106 which have a triangular cross sectional shape and which are formed in a grid pattern so as to protrude from a back surface (lower surface) of a substrate 102 which is to be brought into pressing contact with the ceramic sheet to form the dividing grooves. The inventor conceived the use of this groove forming die 100 to form the grooved green sheet in the fabrication of the composite ferrite sheet of the present invention. The use of this groove forming die 100 permits simultaneous formation of a multiplicity of longitudinal grooves 112 and a multiplicity of transverse grooves 114 that have substantially V-shaped cross section having a desired depth, in a surface of a green sheet 110 having a desired thickness, as shown in FIG. 24, by one-shot operation to press the groove forming die 100 onto the above-indicated surface of the green sheet 110. Thus, the inventor recognized an effective improvement of the accuracy of the depth of the dividing grooves and a considerable improvement of the efficiency of formation of the dividing grooves.

However, the inventor has found problems with the use of the above-described groove forming die 100, since the longitudinal grooves 112 and transverse grooves 114 formed as the dividing grooves with the groove forming blades 104, 106 in one surface of the green sheet 110 have the same depth over the entire area of that surface. Namely, where the thickness of the green sheet 110 is relatively small, the green sheet 110 is difficult to handle alone, and a sintered sheet obtained by firing the green sheet 110 is difficult to handle alone. In addition, the sintered green sheet may have natural rupture in the firing process.

In view of the problems described above, the present inventor made an intensive research in an effort to obtain the grooved green sheet that can be easily handled in the firing process and in the processes preceding and following the firing process. As a result of the intensive research, the inventor has found a fact that the dividing grooves can be advantageously formed in the green sheet by pressing a specific groove forming die on the green sheet, where the dividing grooves have a specific arrangement. Thus, the present invention was made.

It is therefore a first object of the present invention to provide a method of fabricating a composite ferrite sheet with effectively improved quality and productivity, by fabricating a grooved ferrite sheet which can be easily handled in the method of firing a grooved ferrite green sheet and in the processes preceding and following the firing process, even where the thickness of the grooved ferrite green sheet is relatively small. It is a second object of the invention to provide a composite ferrite sheet having excellent properties. It is a third object of the invention to provide an array of sintered ferrite segments which constitutes the composite ferrite sheet and which has excellent properties.

The object indicated above can be advantageously achieved in accordance with the following aspects of the present invention. However, it is to be understood that each of these aspects of the invention may be combined with any other aspect or aspects of the invention, and that the present invention is not limited to the following aspect or technical features thereof, and may comprehend other features which will be recognized from the disclosure of the principle of the invention as a whole in the specification and the accompanying drawings.

(1) A method of fabricating a composite ferrite sheet, comprising the steps of: providing a ferrite green sheet having a predetermined thickness; providing a groove forming die having a pressing surface to be pressed onto the ferrite green sheet, the groove forming die including a plurality of first protrusions having a triangular cross sectional shape and a plurality of second protrusions having a triangular cross sectional shape that are formed on the pressing surface such that the first protrusions and the second protrusions extend in respective two directions perpendicular to each other so as to cooperate with each other to form a grid pattern, each protrusion of at least one of the plurality of first protrusions and the plurality of second protrusions being discontinuous at each imaginary intersecting portion at which an extension line of the first protrusions and an extension line of the second protrusions intersect each other; forming a grooved ferrite green sheet by pressing the pressing surface of the groove forming die onto at least one of opposite major surfaces of the ferrite green sheet, the grooved ferrite green sheet including a plurality of first grooves having V-shaped cross section that correspond to the first protrusions and a plurality of second grooves having V-shaped cross section that correspond to the second protrusions, the first and second grooves cooperating with each other to form a grid pattern, each groove of at least one of the plurality of first grooves and the plurality of second grooves being discontinuous at each imaginary intersecting portion at which an extension line of the first grooves and an extension line of the second grooves intersect each other; obtaining a sintered ferrite sheet by firing the grooved ferrite green sheet, the sintered ferrite sheet having a plurality of first dividing grooves corresponding to the first grooves, and a plurality of second dividing grooves corresponding to the second grooves, the first and second dividing grooves cooperating with each other to form a grid pattern, each dividing groove of at least one of the plurality of first dividing grooves and the plurality of second dividing grooves being discontinuous at each imaginary intersecting portion at which an extension line of the first dividing grooves and an extension line of the second dividing grooves intersect each other; forming a laminated sheet by bonding at least one supporting sheet to at least one of opposite major surfaces of the sintered ferrite sheet; and bending the laminated sheet to rupture the sintered ferrite sheet along the first dividing grooves and the second dividing grooves, into a multiplicity of mutually separate and independent rectangular and planar segments of sintered ferrite which are bonded to the at least one supporting sheet.

(2) The method according to the above aspect (1), wherein each protrusion of the at least one of the plurality of first protrusions and the plurality of second protrusions of the groove forming die is made discontinuous at the each imaginary intersecting portion of the first and second protrusions, by dividing the each protrusion into a plurality of divisions which are spaced apart from each other in an extending direction of the each protrusion at the each imaginary intersecting portion, each of the plurality of divisions having a slant end face adjacent to a corresponding imaginary intersecting portion, the slant end face being inclined such that a distance between the end face and the corresponding imaginary intersecting portion increases as the end face extends in a height direction of the each division from its root toward its top.

(3) The method according to the above aspect (2), wherein a lower edge of the slant end face is spaced apart from the corresponding imaginary intersecting portion in the extending direction of the each protrusion.

(4) The method according to the above aspect (2) or (3), wherein a spacing distance of the plurality of divisions in the extending direction of the each protrusion at the each imaginary intersecting portion is not longer than 0.2 times a grid interval between the protrusions of the grid pattern.

(5) The method according to any one the above aspects (1) to (4), wherein each protrusion of both of the plurality of first protrusions and the plurality of second protrusions of the groove forming die is discontinuous at the each imaginary intersecting portion of the first and second protrusions, and each groove of both of the plurality of first grooves and the plurality of second grooves formed in the grooved ferrite green sheet is discontinuous at the each imaginary intersecting portion of the first and second grooves.

(6) The method according to any one of the above aspects (1) to (5), wherein each protrusion of both of the plurality of first protrusions and the plurality of second protrusions of the groove forming die is discontinuous at the each imaginary intersecting portion of the first and second protrusions, and means for forming a rupture assisting portion which is in the form of a protrusion is provided at the each imaginary intersecting portion of the first and second protrusions, so that each groove of both of the plurality of first grooves and the plurality of second grooves formed in the grooved ferrite green sheet is made discontinuous at the each imaginary intersecting portion of the first and second grooves, and a recess corresponding to the means for forming a rupture assisting portion is formed at the each imaginary intersecting portion of the first and second grooves, independently of the first and second grooves.

(7) The method according to the above aspect (6), wherein the means for forming a rupture assisting portion is a pyramidal protrusion, and the recess formed at the each imaginary intersecting portion of the first and second grooves in the grooved ferrite green sheet has an inverted quadrangular pyramid shape.

(8) The method according to any one of the above aspects (1) to (7), wherein the at least one supporting sheet comprises a single-coated adhesive sheet and a flexible double-coated adhesive sheet, and the single-coated adhesive sheet is bonded to one of the opposite major surfaces of the sintered ferrite sheet and the flexible double-coated adhesive sheet is bonded to the other of the opposite major surfaces, while a release paper is bonded to an outer surface of the double-coated adhesive sheet, whereby the laminated sheet is formed.

(9) The method according to any one of the above aspects (1) to (8), wherein the at least one supporting sheet is bonded to the at least one of the opposite major surfaces of the sintered ferrite sheet such that peripheral portions of the supporting sheet extend outwardly from side faces of the sintered ferrite sheet, the peripheral portions being folded to be bonded to the side faces to cover at least the side faces.

(10) The method according to any one of the above aspects (1) to (9), wherein the laminated sheet is first bent in an extending direction of the plurality of first dividing grooves, and is then bent in an extending direction of the plurality of second dividing grooves after the laminated sheet is turned by 90°.

(11) The method according to any one of the above aspects (1) to (10), wherein the laminated sheet is bent by at least one roller.

(12) The method according to any one of the above aspects (1) to (11), wherein the step of bending the laminated sheet comprises a first bending operation to roll a first roller in pressing contact with the laminated sheet for bending the laminated sheet, and a second bending operation to roll a second roller having an axis of rotation perpendicular to an axis of rotation of the first roller, in pressing contact with the laminated sheet for bending the laminated sheet.

(13) An array of sintered ferrite segments each having a rectangular and planar shape that is obtained from a sintered ferrite sheet including a plurality of first dividing grooves having V-shaped cross section and a plurality of second dividing grooves having V-shaped cross section, which first and second dividing grooves cooperate with each other to form a grid pattern, each dividing groove of at least one of the plurality of first dividing grooves and the plurality of second dividing grooves being discontinuous at each imaginary intersecting portion at which an extension line of the first dividing grooves and an extension line of the second dividing grooves intersect each other, the sintered ferrite sheet being ruptured along the first dividing grooves and the second dividing grooves, into the sintered ferrite segments, wherein at least one side face of each of the sintered ferrite segments includes at least one ruptured section that is ruptured over an entire thickness of the sintered ferrite segment at least one end portion in an extending direction of one of the first dividing groove and the second dividing groove.

(14) An array of sintered ferrite segments having rectangular and planar shape that is obtained from a sintered ferrite sheet having a plurality of first dividing grooves having V-shaped cross section and a plurality of second dividing grooves having V-shaped cross section, which first and second dividing grooves cooperate with each other to form a grid pattern, each dividing groove of both of the plurality of first dividing grooves and the plurality of second dividing grooves being discontinuous at each imaginary intersecting portion at which an extension line of the first dividing grooves and an extension line of the second dividing grooves intersect each other, the sintered ferrite sheet further having a rupture assisting portion at the imaginary intersecting portion, the sintered ferrite sheet being ruptured along the first dividing grooves and the second dividing grooves, into the sintered ferrite segments, wherein at least one side face of each of the sintered ferrite segments includes at least one ruptured section that is ruptured over an entire thickness of the sintered ferrite segment, except for a portion corresponding to the rupture assisting portion, at least one end portion in an extending direction of one of the first dividing groove and the second dividing groove.

(15) A composite ferrite sheet comprising an array of sintered ferrite segments as defined in the above aspect (13) or (14) and at least one flexible supporting sheet, wherein the sintered ferrite segments are arranged in mutually perpendicular two directions, and the at least one flexible supporting sheet is bonded to at least one of opposite major surfaces of each of the sintered ferrite segments such that adjacent ones of the sintered ferrite segments are butted together so as to form a grid pattern.

In the method of fabricating the composite ferrite sheet in accordance with the present invention, the first grooves and the second grooves can be formed in a grid pattern in the ferrite green sheet at one time with a high degree of accuracy of their depth, by simply pressing the groove forming die having the specifically configured first and second protrusions onto one of the opposite major surfaces of the ferrite green sheet. Thus, the productivity of the grooved ferrite green sheet is effectively improved, and the desired composite ferrite sheet can be advantageously fabricated with improved productivity.

Further, the grooved ferrite green sheet formed by using the groove forming die having the specifically configured first and second protrusions in accordance with the present invention is provided with the first and second grooves which have the triangular cross sectional shape and which cooperate with each other to form the grid pattern in which each groove of at least one of those two kinds of grooves is discontinuous at each imaginary intersecting portion of the first and second grooves, namely, is divided into a plurality of divisions which are spaced apart from each other in the extending direction of the groove at the imaginary intersecting portion. Accordingly, unlike an intersecting portion of two kinds of grooves formed in the conventional grid pattern, the imaginary intersecting portion of the grooved ferrite green sheet is not provided with a groove formed in the direction of thickness of the grooved ferrite green sheet, so that the grooved ferrite green sheet is reinforced in its direction of thickness by the imaginary intersecting portions. As a result, the ease of handling of the grooved green sheet is advantageously improved, and the ease of handling of the sintered ferrite sheet obtained by firing the grooved ferrite green sheet is effectively improved, making it possible to effectively prevent a problem of natural rupture of the sintered ferrite sheet.

Where all of the grooves of both of the two kinds of grooves formed in the grid pattern are discontinuous at the imaginary intersecting portions of the two kinds of grooves, namely, where each groove of the two kinds of grooves is divided into a plurality of divisions which are spaced apart from each other at each imaginary intersecting portion, the grooved ferrite green sheet can be further reinforced, and recesses can be formed independently of the grooves, at the respective imaginary intersecting portions, by respective protrusions formed on the groove forming die, which are means for forming rupture assisting portions, so that those recesses permit easier rupturing of the sintered ferrite sheet obtained by firing the grooved ferrite green sheet, such that the sintered ferrite sheet is more accurately ruptured along the dividing grooves formed therein.

Furthermore, at least one side face of the multiplicity of sintered ferrite segments obtained by rupturing the sintered ferrite sheet to obtain the composite ferrite sheet of the invention has at least one ruptured section that is ruptured over an entire thickness of the sintered ferrite segment at least one end portion in an extending direction of one of the first dividing groove and the second dividing groove (except for a portion corresponding to the rupture assisting portion if provided at each imaginary intersecting portion). Thus, a planar ferrite layer is advantageously formed by butting the multiplicity of sintered ferrite segments in the two mutually perpendicular directions so as to be arranged in a grid pattern. In addition, unlike a composite ferrite sheet having sintered ferrite segments obtained from a sintered ferrite sheet having two kinds of continuous dividing grooves, the present composite ferrite sheet has a smaller surface area of a gap between the opposite side faces of the adjacent two sintered ferrite segments, so that the present composite ferrite sheet is accordingly protected against reduction of effective magnetic permeability caused by flux leakage, and deterioration of its rupturing characteristics in the bending step.

BRIEF DESCRIPTION OF THE DRAWINGS

The above and other objects, features, advantages and technical and industrial significance of the present invention will be better understood by reading the following detailed description of a preferred embodiment of the present invention, when considered in connection with the accompanying drawings, in which.

DETAILED DESCRIPTION OF THE INVENTION

To further clarify the present invention, one typical embodiment of this invention will be described in detail by reference to the drawings.

Figure 1:
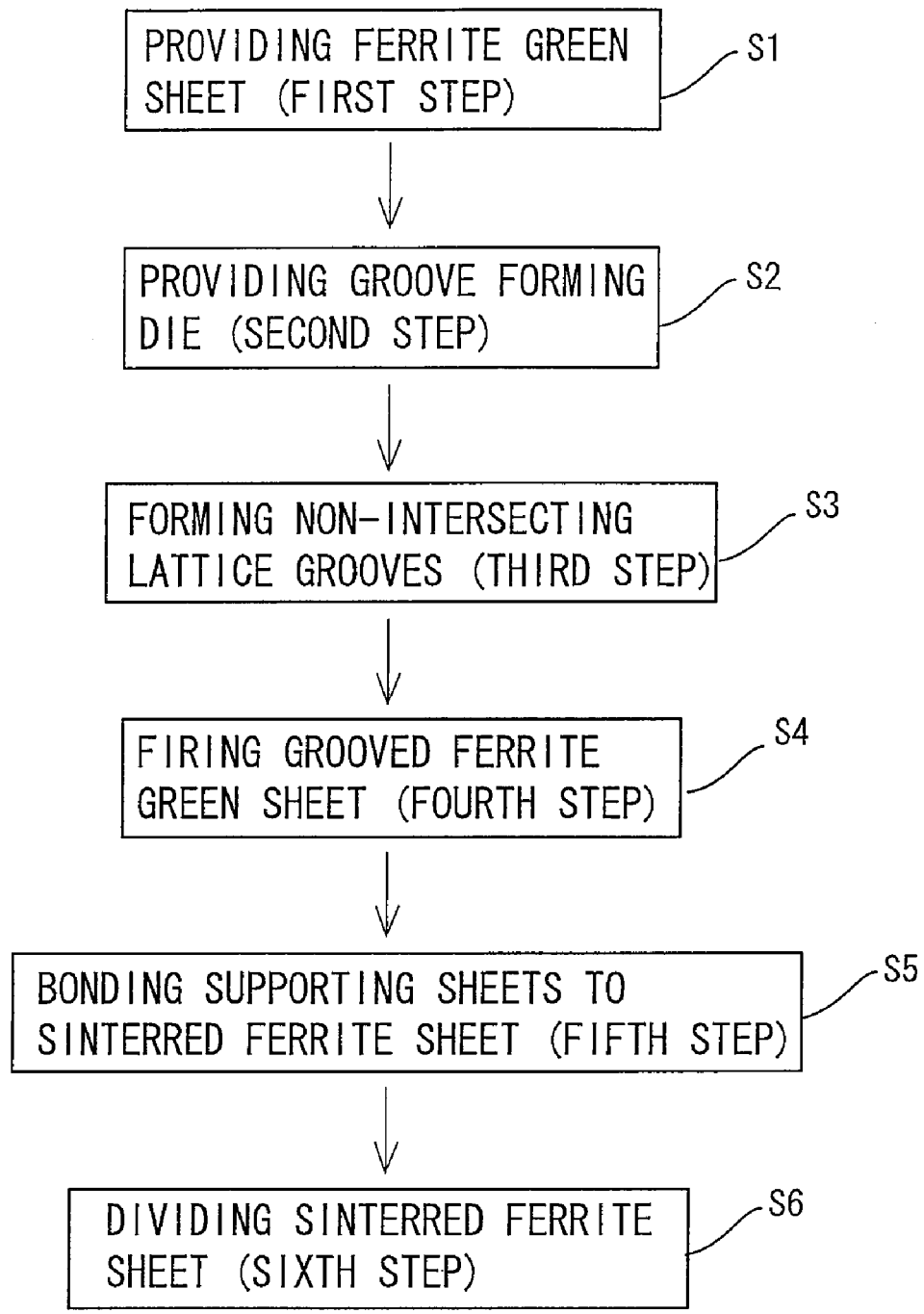
FIG. 1 is a view for explaining steps of fabricating a composite ferrite sheet of the present invention.

Referring first to FIG. 1, there are shown steps of a method of fabricating a composite ferrite sheet of this invention. Namely, the composite ferrite sheet is fabricated by the process including a first step S1 of providing a ferrite green sheet, a second step S2 of providing a groove forming die having two kinds of protrusions which have a triangular cross sectional shape and which are arranged in a non-intersecting grid pattern, a third step S3 of forming a grooved ferrite green sheet having two kinds of non-intersecting V-shaped grooves, a fourth step S4 of firing the grooved ferrite green sheet to obtain a sintered ferrite sheet, a fifth step S5 of bonding supporting sheets to the sintered ferrite sheet, to obtain a laminated ferrite sheet, and a sixth step S6 of bending the laminated ferrite sheet so as to divide the sintered ferrite sheet of the laminated ferrite sheet into a multiplicity of rectangular segments which are regularly arranged longitudinally and transversely, to form a planar ferrite layer.

In the first step S1 of the method Of fabricating the composite ferrite sheet, the ferrite green sheet having a predetermined thickness is prepared in the same manner as in the conventional process. That is, a ferrite powder known in the art, such as a powder of Mn—Zn ferrite, a powder of Mn—Ni ferrite, a powder of Ni—Zn ferrite, a powder of Mg—Zn ferrite, a powder of Ni—Zn—Cu ferrite, a powder of Ba ferrite, and a powder of Li ferrite, is mixed with a binder such as a butyral resin and polybutyl methacrylate, and a solvent such as butyl alcohol and toluene, to prepare a slurry. This slurry is extruded in the form of a sheet onto a long polyethylene terephthalate film, by a doctor blade method or any other suitable known sheet forming method, to obtain the desired ferrite green sheet having a thickness of about 1 to 2000 µm, preferably, about 50 to 700 µm, which is used to fabricate the composite ferrite sheet of this invention.

Figure 2:
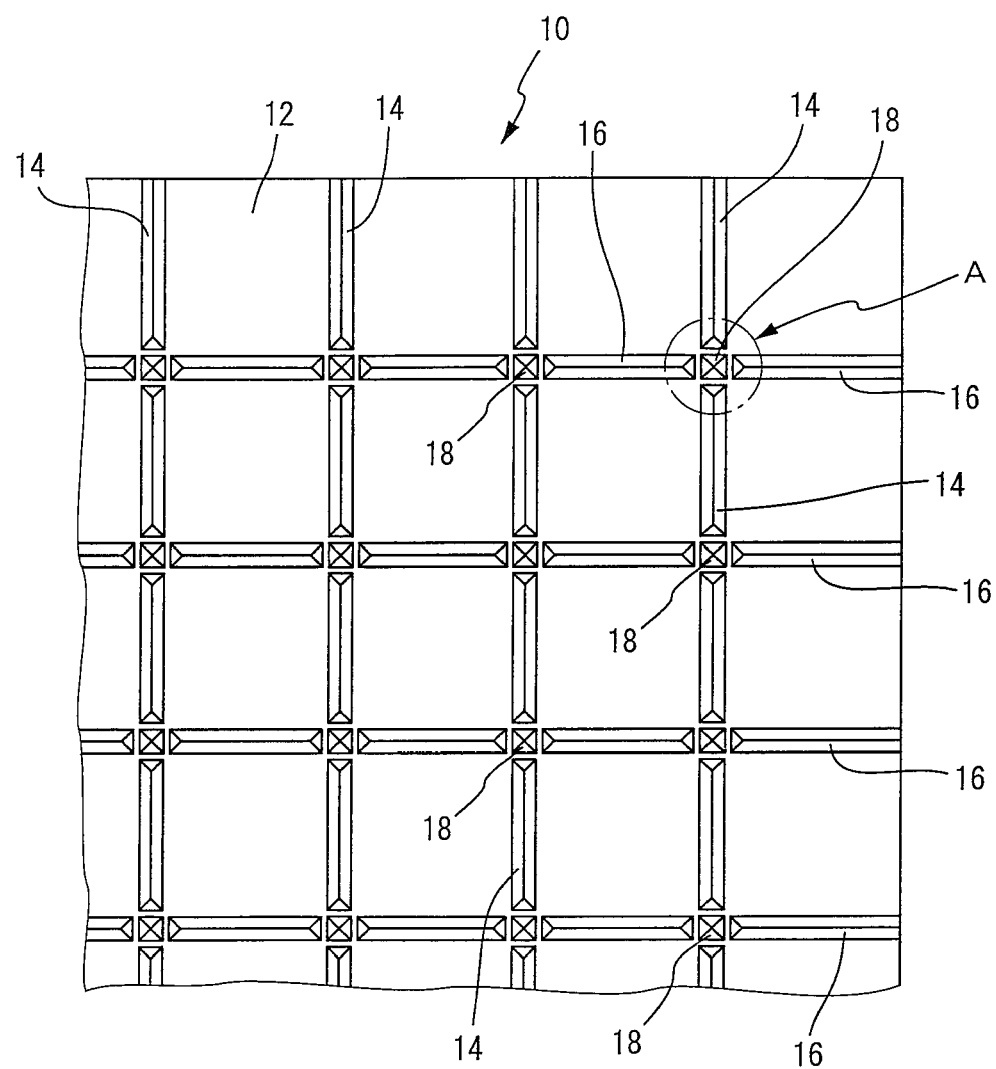
FIG. 2 is an illustrative plan view showing a portion of an example of a groove forming die used in the method of fabricating the composite ferrite sheet of the present invention, on the side of a surface of the groove forming die which is to be pressed onto a ferrite green sheet.
Figure 3:
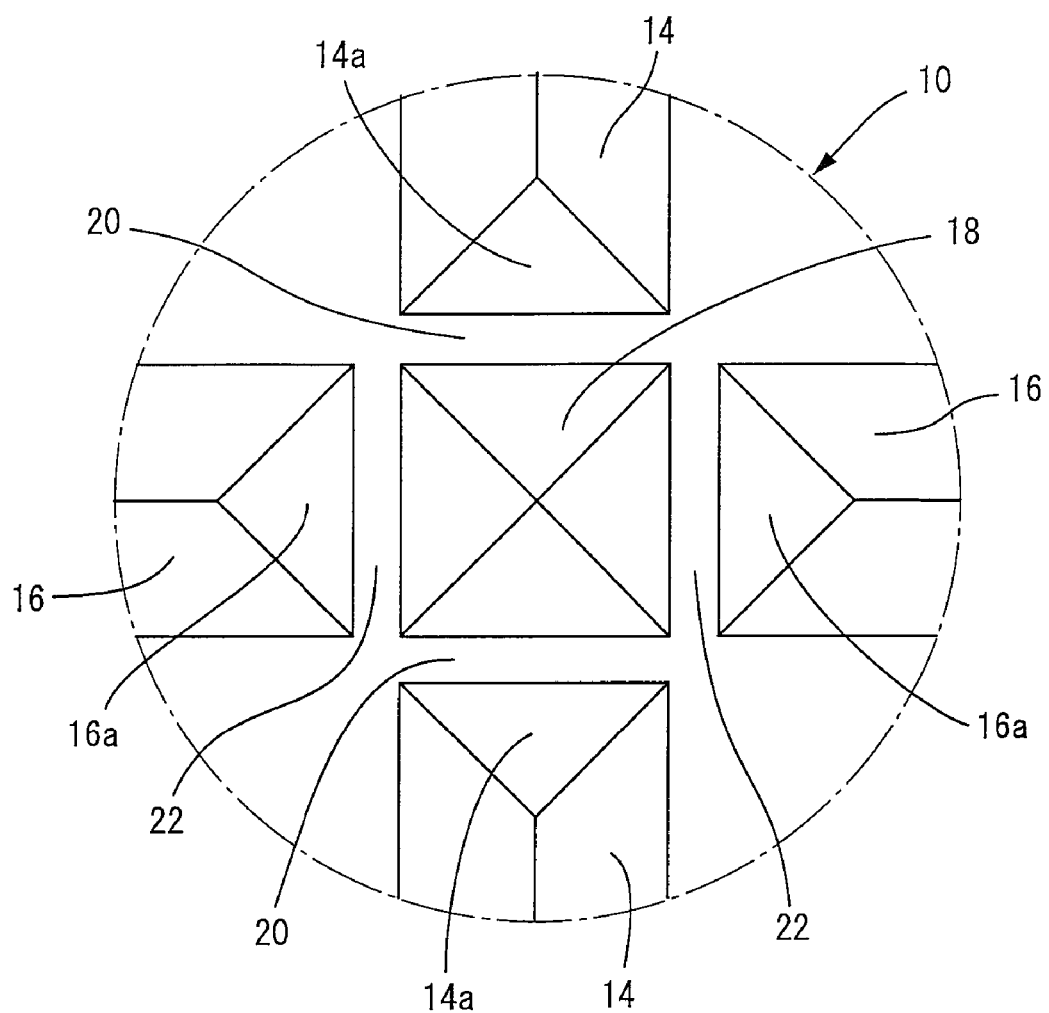
FIG. 3 is an illustrative enlarged view of a portion A in FIG. 2, showing one of intersecting portions of the grooved forming die, at which a first protrusion and a second protrusion intersect each other.
Figure 4:
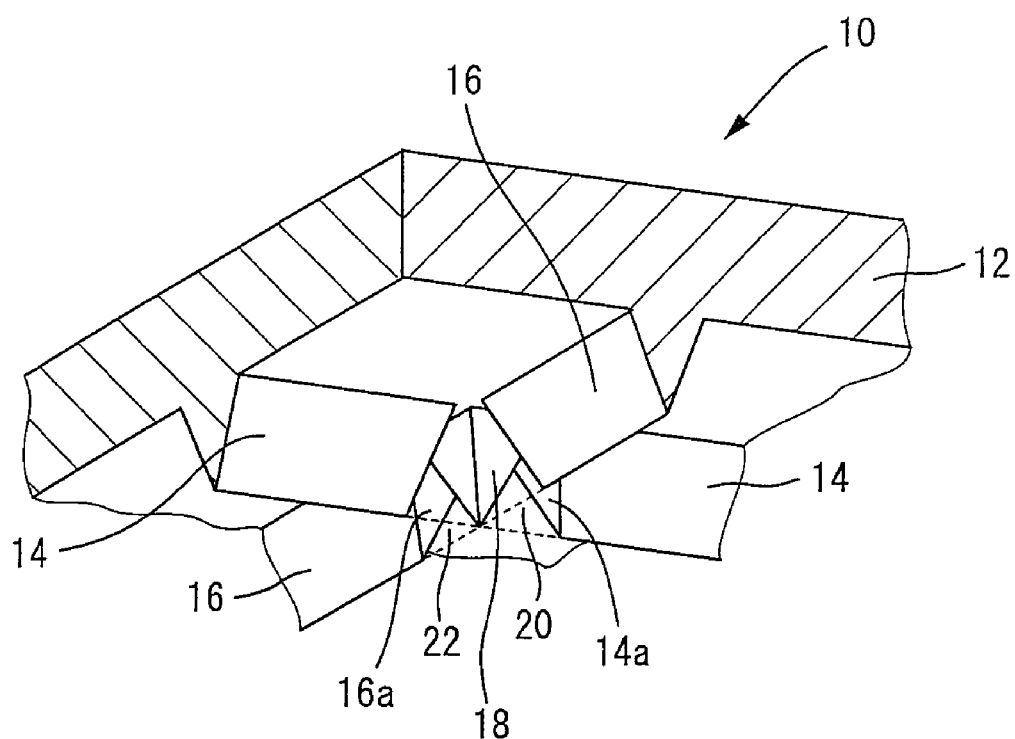
FIG. 4 is an illustrative perspective view showing one of intersecting portions of the groove forming die shown in FIG. 2, at which the first and second protrusions intersect each other.

As shown in FIGS. 2 to 4, the groove forming die 10 prepared in the second step S2 has a substrate 12 in the form of a relatively thick plate which is formed of a metallic or any other suitable hard material and which has major opposite surfaces one of which functions as a pressing surface which is to be pressed onto the ferrite green sheet and on which there are provided a plurality of first protrusions 14 having a triangular cross sectional shape and formed discontinuously in parallel with each other and in a spaced-apart relationship with each other, and a plurality of second protrusions 16 having a triangular cross sectional shape and formed discontinuously in parallel with each other and in a spaced-apart relationship with each other, so as to extend perpendicularly to an extending direction of the first protrusions 14. Thus, the first protrusions 14 and the second protrusions 16 are arranged such that the first and second protrusions 14, 16 cooperate with each other to form a grid pattern. As is apparent from FIGS. 3 and 4, each of those first and second protrusions 14, 16 is formed discontinuously with spacing gaps 20, 22 (described below) provided at each position (at each imaginary intersecting portion) at which the extension line of the first protrusion 14 and the extension line of the second protrusion 16 intersect each other.

At each imaginary intersecting potion referred to above, there is formed a pyramidal protrusion 18 in the form of a quadrangular pyramid which is spaced apart and independent of the first and second protrusions 14, 16. This pyramidal protrusion 18, which is provided as means for forming a rupture assisting portion, has the same height as the first and second protrusions 14, 16. The first and second protrusions 14, 16 have respective slant end faces 14a, 16a adjacent to the pyramidal protrusion 18 at each imaginary intersecting portion, as shown in FIG. 3. Each of those slant end faces 14a, 16a is inclined such that a distance between the end face 14a, 16a and the pyramidal protrusion 18 increases as the end face 14a, 16a extends in the height direction of the corresponding protrusion 14, 16 from its root toward its top. The spacing gaps 20, 22 described above are provided between the lower edges of the slant end faces 14a, 16a at the base of the first and second protrusions 14, 16 and the corresponding lower edges of the pyramidal protrusion 18 at its base, so that the protrusions 14, 16 and the pyramidal protrusion 18 are not contiguous with each other, namely, the pyramidal protrusion 18 is spaced apart and independent of the first and protrusions 14, 16. The four lower edges of the pyramidal protrusion 18 at its base have a length almost equal to the width dimension of the first and second protrusions 14, 16 (almost equal to the length of the above-indicated lower edges of the slant end faces 14a, 16a), as is apparent from FIG. 3.

The first protrusions 14 and the second protrusions 16 of the groove forming die 10 constructed as described above can be formed by various machining or forming methods known in the art. For instance, the first and second protrusions 14, 16 can be easily formed by a machining method as disclosed in FIG. 1 of JP-A-2009-297770.

Figure 5:
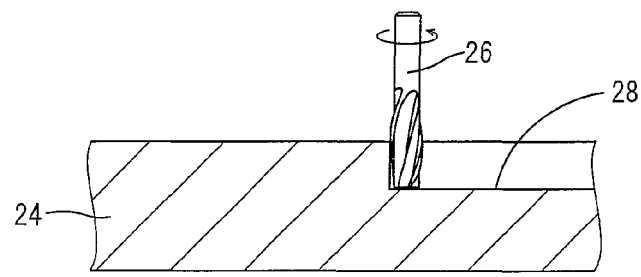
FIG. 5 is a fragmentary illustrative cross sectional view showing one step in a method of forming the protrusions of the groove forming die used in the present invention.
Figure 6:
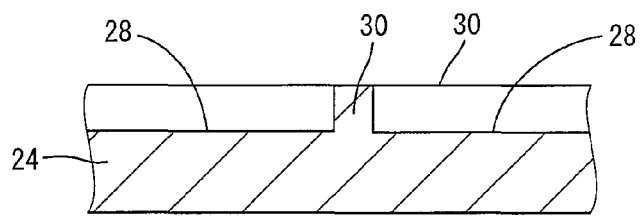
FIG. 6 is a fragmentary illustrative cross sectional view showing another step in the method of forming the protrusions of the groove forming die used in the present invention.

Described more specifically, one surface of a thick plate blank 24 of a special steel for the groove forming die 10 is first machined with a first cutting tool 26 such as a straight end mill, as shown in FIG. 5, to form rectangular recesses 28 which are regularly arranged so as to extend in the longitudinal and transverse directions, such that portions of the blank 24 in which the first and second protrusions 14, 16 are to be formed are left uncut. Thus, lattice protrusions 30 having a rectangular cross sectional shape are formed in the above-indicated surface of the thick plate blank 24, as shown in FIG. 6, such that the lattice protrusions 30 extend in the longitudinal and transverse direction, so as to intersect each other.

Figure 7:
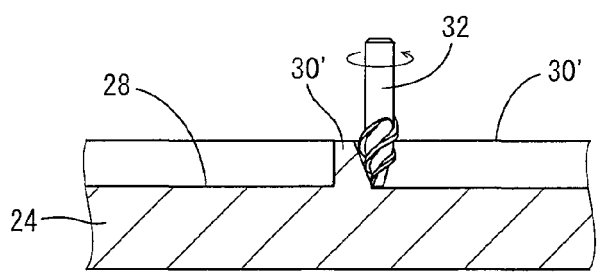
FIG. 7 is a fragmentary illustrative cross sectional view showing a further step in the method of forming the groove forming die used in the present invention.
Figure 8:
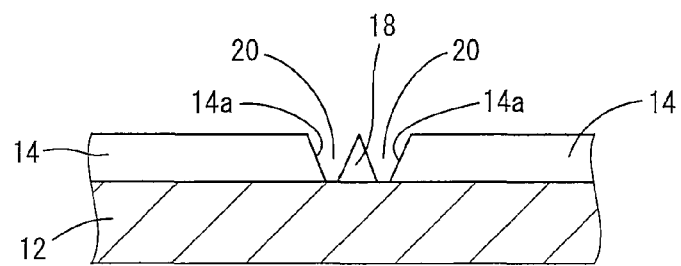
FIG. 8 is a fragmentary illustrative cross sectional view showing one protrusion of the groove forming die prepared by the steps of FIGS. 5 to 7.

Then, the lattice protrusions 30 are machined at their opposite side faces, with a second cutting tool 32 such as a tapered end mill, such that the machined opposite side faces are inclined to form lattice protrusions 30' having a triangular cross sectional shape, as shown in FIG. 7. Subsequently, the intersecting portions of the lattice protrusions 30' are machined with the second cutting tool 32 or another cutting tool having a taper angle different from that of the second cutting tool 32, so that the lattice protrusions 30' are made discontinuous at the intersecting portions, whereby the first protrusions 14 having the triangular cross sectional shape and the second protrusions 16 having the triangular cross sectional shape are formed on the substrate 12, as shown in FIG. 8, such that the first and second protrusions 14, 16 are discontinuous at the above-indicated imaginary intersecting portions, with the pyramidal protrusion 18 being located at the center of each imaginary intersecting portion. Thus, the groove forming die 10 as shown in FIG. 2 is fabricated.

According to the machining method described above, the first and second protrusions 14, 16 are formed discontinuously at the imaginary intersecting portions, while at the same time the pyramidal protrusions 18 are formed at the respective imaginary intersecting portions, whereby the productivity of the groove forming die 10 is considerably improved.

Figure 9:
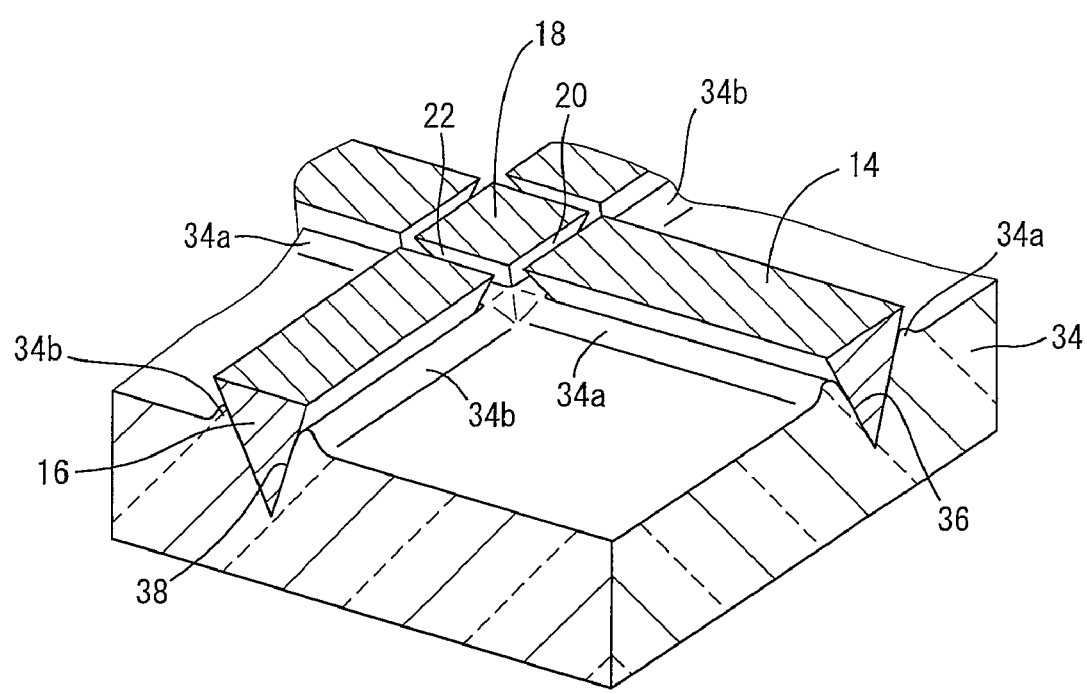
FIG. 9 is a fragmentary illustrative perspective view of one of the intersecting portions of the first and second protrusions of the groove forming die shown in FIG. 4, showing the first and second protrusions in the process of being pressed onto the ferrite green sheet.

Then, the third step S3 is implemented to form non-intersecting lattice grooves in the ferrite green sheet, by using the groove forming die 10 fabricated as described above. In this third step S3, the first protrusions 14 and the second protrusions 16 of the groove forming die 10 are pressed onto one surface of the ferrite green sheet 34, such that the first and second protrusions 14, 16 are partially embedded into the ferrite green sheet 34, as shown in FIG. 9. As a result of the partial embedment of the first and second protrusions 14, 16, portions of the material of the ferrite green sheet 34 are forcibly raised adjacent to and alongside the first and second protrusions 14, 16, to form raised portions 34a, 34b. Since the first and second protrusions 14, 16 are discontinuous at the imaginary intersecting portions in the presence of the spacing gaps 20, 22, as shown in FIG. 4, the material of the raised portions 34a, 34b is absorbed into the spacing gaps 20, 22 to some degree, so that a required force of pressing of the groove forming die 10 against the ferrite green sheet 34 can be reduced, and an operation to release the groove forming die 10 from the ferrite green sheet 34 after the pressing of the groove forming die 10 onto the ferrite green sheet 34 is facilitated.

Figure 10:
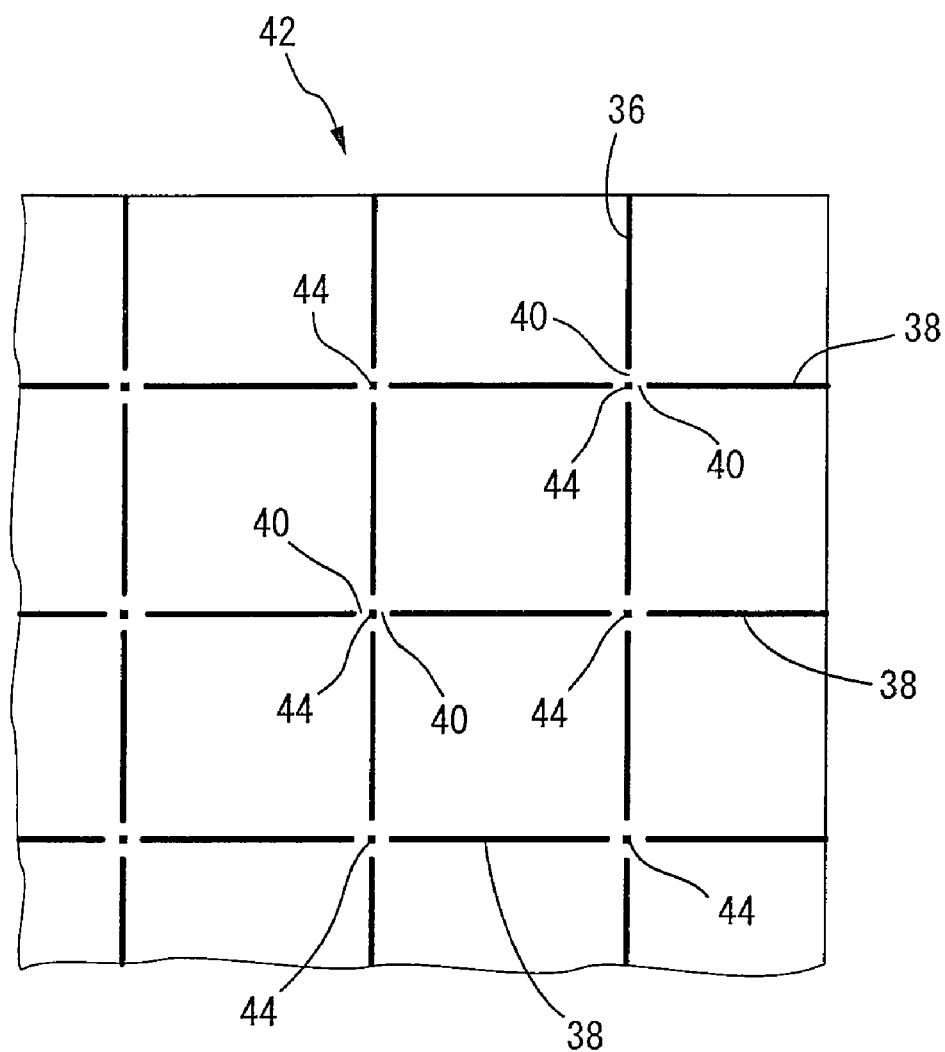
FIG. 10 is a fragmentary illustrative view showing the surface of the ferrite green sheet in which first and second grooves are formed by pressing the groove forming die shown in FIG. 9 onto the surface.
Figure 11:
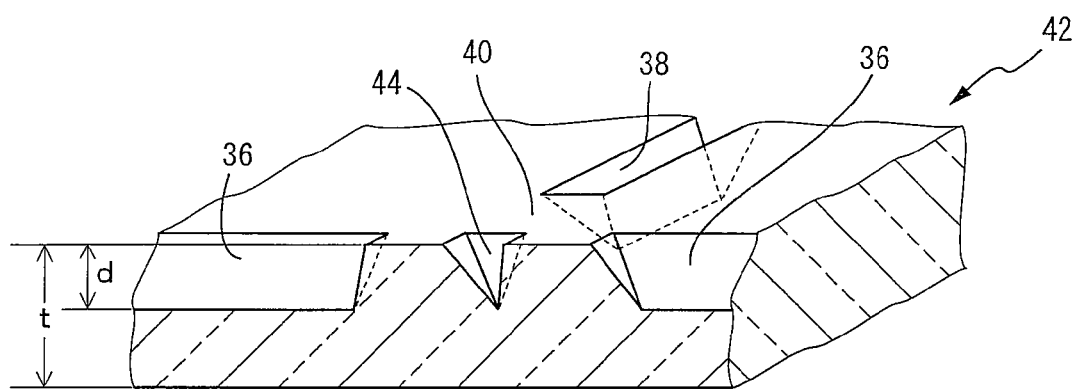
FIG. 11 is a fragmentary illustrative perspective view showing one of intersecting portions of the grooved ferrite green sheet shown in FIG. 10, at which the first and second grooves intersect each other.

As a result of pressing of the groove forming die 10 onto the ferrite green sheet 34 as described above, first grooves 36 which have V-shaped cross section and correspond to the respective first protrusions 14 and second grooves 38 which have also V-shaped cross section and correspond to the respective second protrusions 16 are formed in a grid pattern in the ferrite green sheet 34, as shown in FIG. 10, such that each of the first and second grooves 36, 38 is discontinuous at each position (at each imaginary intersecting portion) at which the extension line of the first groove 36 and the extension line of the second groove 38 intersect each other. At each imaginary intersecting portion, there are formed connecting portions 40 which connect mutually adjacent rectangular areas of the ferrite green sheet 34 that are defined by the first and second grooves 36, 38. Thus, the ferrite green sheet 34 is formed by the groove forming die 10 into a grooved ferrite green sheet 42 having the first and second grooves 34, 36 and the connecting portions 40. Further, a recess 44 having an inverted quadrangular pyramid shape is formed by the corresponding pyramidal protrusion 18 described above, at each imaginary intersecting portion of the first and second grooves 34, 36, as shown in FIG. 11. This recess 44 has a depth almost equal to the depth of the first and second grooves 36, 38. The connecting portions 40 described above are located adjacent to the recess 44 at each imaginary intersecting portions of the grooves 36, 38, and have a thickness equal to a thickness t of the grooved ferrite green sheet 42 (thickness of the ferrite green sheet 34). In the presence of the connecting portions 40, the grooved ferrite green sheet 42 has a higher degree of mechanical strength than a grooved ferrite green sheet in which grooves are continuous at each intersecting portion thereof (a grooved ferrite green sheet which does not have discontinuous grooves), so that the grooved ferrite green sheet 42 has an increased ease of handling.

The first and second grooves 36, 38 formed in the grooved ferrite green sheet 42 have a depth d which is generally about $1/12$ to $1/2$ of the thickness t of the grooved ferrite green sheet 42, preferably about $1/4$ of the thickness t. When the depth d of the grooves 36, 38 is excessively large, surface areas of contact of adjacent ferrite segments obtained by breaking a sintered ferrite sheet obtained by firing the grooved ferrite green sheet 42 as described below tend to be reduced, giving rise to a problem of reduced magnetic permeability of a planar ferrite layer constituted by the ferrite segments. When the depth d of the grooves 36, 38 is excessively small, on the other hand, it is undesirably difficult to break the sintered ferrite sheet into the ferrite segments along the first and second grooves 36, 38.

Figure 12:
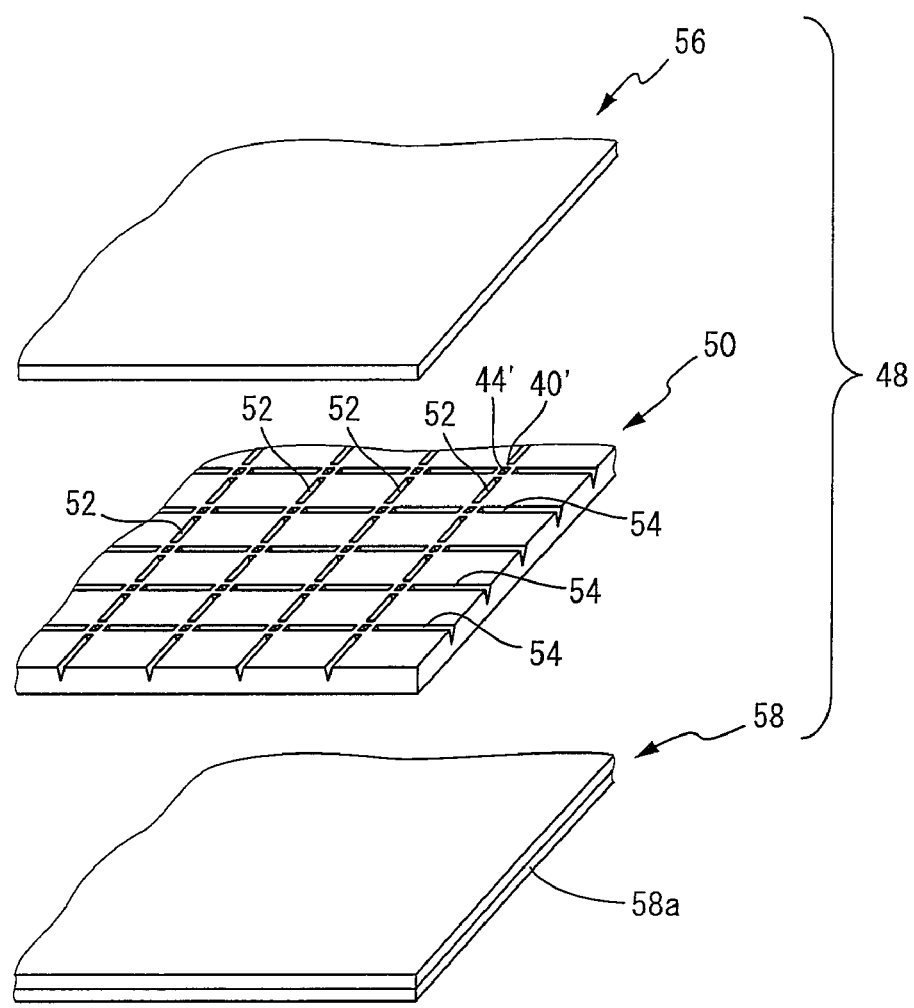
FIG. 12 is an illustrative perspective view showing a sintered ferrite sheet on which a single-coated adhesive sheet and a double-coated adhesive sheet are laminated.

In the next fourth step S4 of the present invention, the grooved ferrite green sheet 42 having the first grooves 36 and second grooves 38, and the connecting portions 40 at the imaginary intersecting portions of the grooves 36, 38, as described above, is fired into the sintered ferrite sheet 50, under a suitable firing condition known in the art, for example, at a firing temperature of 850 to 1350° C. As shown in FIG. 12, this sintered ferrite sheet 50 has first dividing grooves 52 having V-shaped cross section which correspond to the respective first grooves 36 of the grooved ferrite green sheet 42, and second dividing grooves 54 having V-shaped cross section which correspond to the respective second grooves 38 of the grooved ferrite green sheet 42. The first and second dividing grooves 52, 54 are arranged in a grid pattern such that connecting portions 40', which correspond to the connecting portions 40 of the grooved ferrite green sheet 42 shown in FIG. 11, and recesses 44', which correspond to the recesses 44 of the grooved ferrite green sheet 42 and have an inverted quadrangular pyramid shape, are disposed at imaginary intersecting portions of the first and second dividing grooves 52, 54.

In the sintered ferrite sheet 50 obtained by firing the grooved ferrite green sheet 42 in the sintering step (fourth step) S4, the first and second dividing grooves 52, 54 are discontinuous at their imaginary intersecting portions, and the connecting portions 40' are provided at the imaginary intersecting portions, to prevent flexure of the sintered ferrite sheet 50, making it possible to maintain a planar state of the sintered ferrite sheet 50. In the presence of the connecting portions 40', the sintered ferrite sheet 50 is highly resistant to its flexure and breakage during handling thereof. That is, the sintered ferrite sheet 50 provided with the connecting portions 40' at the imaginary intersecting portions of the dividing grooves 52, 54 has a considerably reduced possibility of breakage into the ferrite segments before supporting sheets are bonded to the sintered ferrite sheet 50. Accordingly, the sintered ferrite sheet 50 has a high yield rate owing to the reduced possibility of breakage before the next fifth step S5 is implemented.

In the fifth step S5, a supporting sheet having a suitable degree of flexibility is bonded to at least one of the opposite major surfaces of the sintered ferrite sheet 50 obtained by firing the grooved ferrite green sheet 42 in the fourth step S4, so that the supporting sheet protects and supports the sintered ferrite sheet 50. Described more specifically by reference to the example of FIG. 12, two supporting sheets in the form of a single-coated adhesive sheet 56 and a double-coated adhesive sheet 58 are respectively bonded to the respective opposite major surfaces of the sintered ferrite sheet 50, to form a laminated sheet 48 consisting of the sintered ferrite sheet 50 and the adhesive sheets 56, 58. The double-coated adhesive sheet 58 has a release paper 58a on its outer surface opposite to its inner surface that is bonded to the sintered ferrite sheet 50. The laminated sheet 48 is bonded to a desired device such as an electronic device, after the release paper 58a is removed from the double-coated adhesive sheet 58.

Generally, each of the single-coated adhesive sheet 56 and double-coated adhesive sheet 58 described above consists of a core layer in the form of a flexible resin film such as a polyethylene terephthalate film having a suitable degree of extensibility (elongation property), and an adhesive layer formed on the core layer. However, a supporting sheet formed of a paper or any material other than a resin material may be bonded with an adhesive agent to the sintered ferrite sheet 50. Further, the single-coated adhesive sheet 56 and the double-coated adhesive sheet 58 may be bonded to the sintered ferrite sheet 50 to fabricate the laminated sheet 48 such that the sintered ferrite sheet 50 is successively fed between the adhesive sheets 56, 58 while these adhesive sheets 56, 58 are continuously fed from respective wheels.

In the next sixth step S6, the sintered ferrite sheet 50 of the laminated sheet 48 fabricated as described above is ruptured or broken along and divided at the first and second dividing grooves 52, 54 formed therein, into a multiplicity of ferrite segments 60 (shown in FIG. 13) in the form of rectangular plates. Namely, the laminated sheet 48 is bent in the directions of extension of the first and second dividing grooves 52, 54 of the sintered ferrite sheet 50, to thereby rupture or break the sintered ferrite sheet 50 at the first and second dividing grooves 52, 54 into the multiplicity of rectangular ferrite segments 60 formed of the sintered ferrite material. The operations of bending the laminated sheet 48 in the two mutually perpendicular directions may be generally performed by pressing the laminated sheet 48 onto a roller or any other body having a non-planar outer surface, or vice versa, that is, pressing the roller or any other body onto the laminated sheet 48.

Where the laminated sheet 48 is successively fabricated in the above-described fifth step S5, it is preferred that the operation to bend the laminated sheet 48 in the longitudinal direction (in the extending direction of the first dividing grooves 52) is first performed, and then the operation to bend the laminated sheet 48 in the transverse direction (in the extending direction of the second dividing grooves 54) is performed. Although a single roller may be rolled in pressing contact with the laminated sheet 48 in the above-indicated two directions to divide the sintered ferrite sheet 50 into the multiplicity of ferrite segments 60 while the laminated sheet 48 is held stationary, two rollers may be used to further improve the productivity of a composite ferrite sheet 62 (described below). More specifically described, a roller may be rolled in pressing contact with one of the supporting sheets (adhesive sheets 56, 58) of the laminated sheet 48 while the laminated sheet 48 in the form of an elongate band is being fed, such that the axis of rotation of the roller is parallel to the direction of width of the elongate band of the laminated sheet 48, so that the sintered ferrite sheet 50 is divided at the first dividing grooves 52 into a plurality of elongate strips, which are then divided along the second dividing grooves 54, into the multiplicity of rectangular ferrite segments 60, by another roller having an axis of rotation parallel to the direction of feeding of the laminated sheet 48 (parallel to the direction of width of the elongate strips), while the laminated sheet 48 is held stationary. Further, the laminated sheet 48 having a desired length, which is obtained by cutting an elongate blank, may be first bent in one of the extending directions of the first and second dividing grooves 52, 54, to divide the sintered ferrite sheet 50 into strips, subsequently turned by about 90° and then bent in the other direction, to divide the strips into the rectangular ferrite segments 60.

Thus, the sintered ferrite sheet 50 of the laminated sheet 48 is bent along the first and second dividing grooves 52, 54, and is ruptured or broken into the multiplicity of mutually separate and independent planar ferrite segments 60 in the form of the rectangular plates, which are bonded to the single-coated adhesive sheet 56 and double-coated adhesive sheet 58, so as to form a planar ferrite layer between these adhesive sheets 56, 58, whereby the composite ferrite sheet 62 is eventually fabricated.

Figure 13:
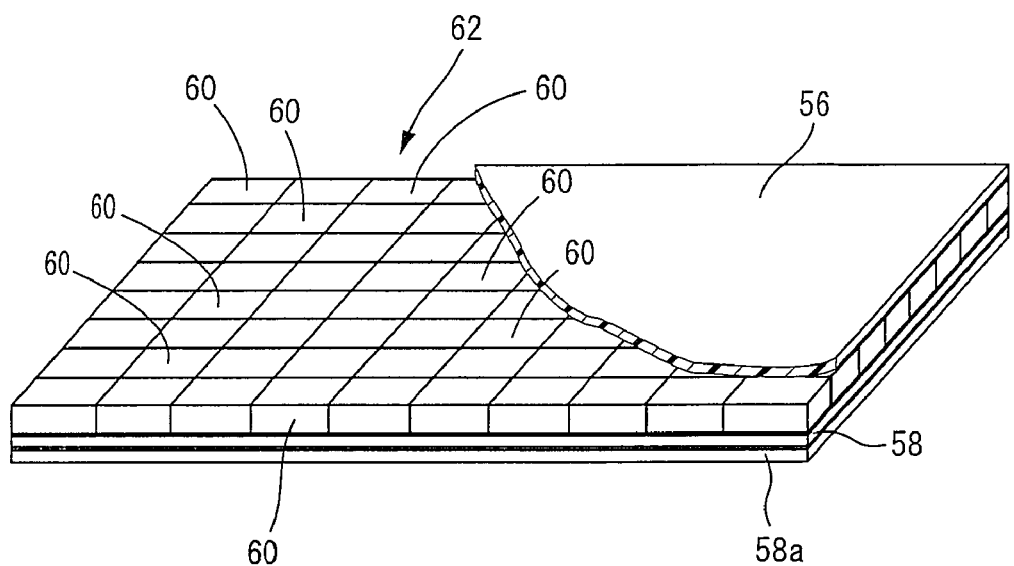
FIG. 13 is an illustrative partly cutaway perspective view showing one example of the composite ferrite sheet fabricated in accordance with the present invention.
Figure 14:
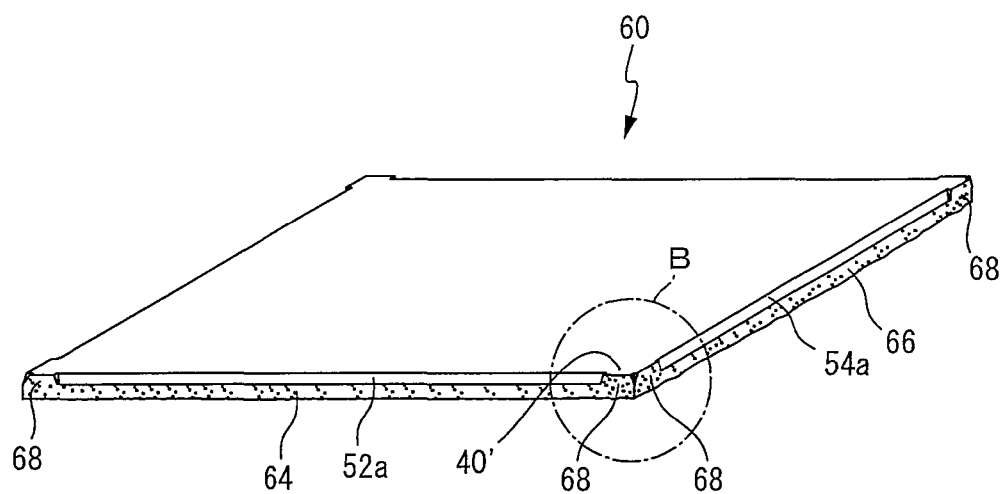
FIG. 14 is an illustrative perspective view showing one of ferrite segments obtained by dividing the sintered ferrite sheet of the composite ferrite sheet shown in FIG. 13.

As shown in FIG. 13, in the thus fabricated composite ferrite sheet 62, the planar ferrite layer consisting of the multiplicity of rectangular ferrite segments 60 regularly arranged in the longitudinal and transverse directions is sandwiched by and between the single-coated and double-coated adhesive sheets 56, 58. This composite ferrite sheet 62 is cut into pieces of a desired size, or cut to have a desired shape or pattern, depending upon its specific application. Each of the multiplicity of rectangular ferrite segments 60 constituting the ferrite layer of the composite ferrite sheet 62 has ruptured surfaces that are sections of the four side faces of the ferrite segment 60 which are located below the bottom of the dividing grooves 52, 54 and sections corresponding to the connecting portions 40 at the four corners of the ferrite segment 60.

Figure 15:
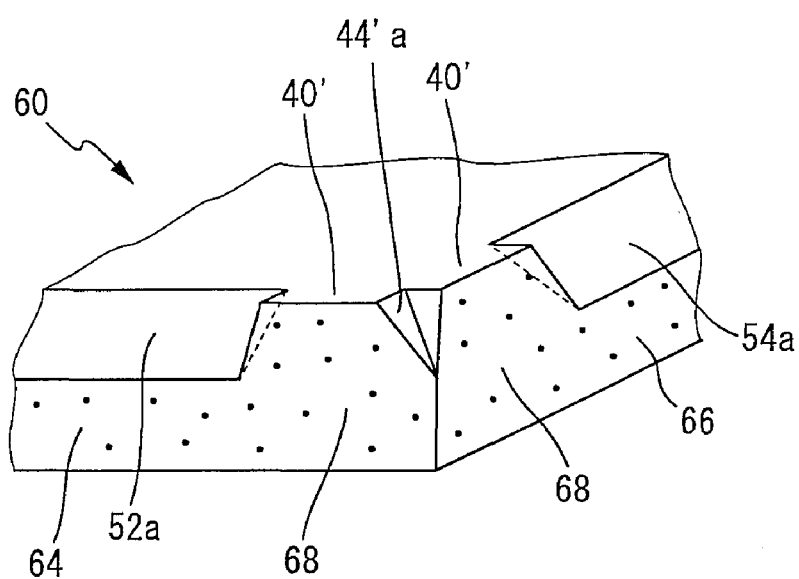
FIG. 15 is an illustrative enlarged view of a portion B shown in FIG. 14.
Figure 16:
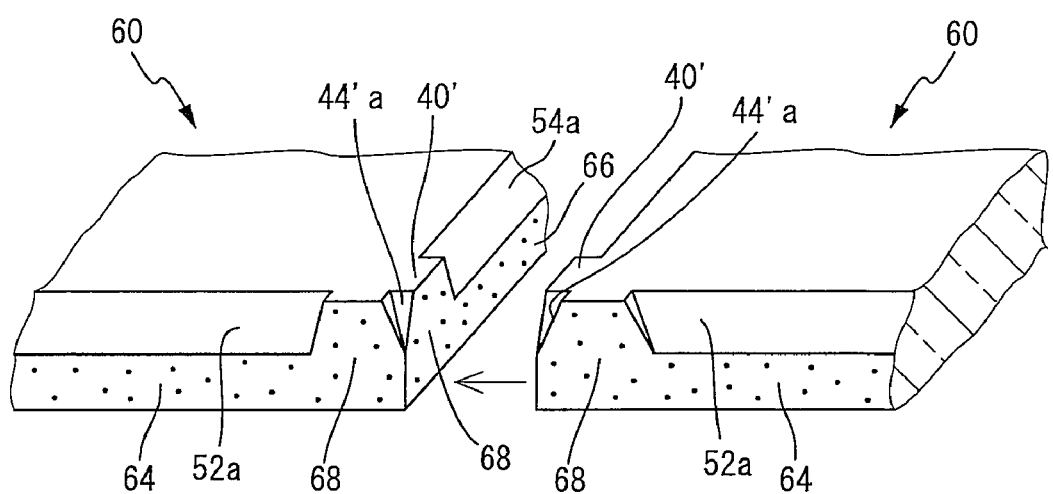
FIG. 16 is a fragmentary illustrative perspective view showing the two adjacent ferrite segments which are obtained by dividing the sintered ferrite sheet of the composite ferrite sheet shown in FIG. 13 and which are spaced apart from each other.

An observatory analysis of the four side faces of each ferrite segment 60 reveals not only the presence of first groove traces 52a derived from the first grooves 52 having the predetermined depth, and second groove traces 54a derived from the second grooves 54 having the predetermined depth, but also the presence of first ruptured surfaces 64 located below the first groove traces 52a, and second ruptured surfaces 66 located below the second groove traces 54a, as shown in enlargement in FIGS. 15 and 16. The observatory analysis also reveals the presence of ruptured surfaces 68 corresponding to the connecting portions 40' at the four corner portions of the ferrite segment 60 corresponding to the respective imaginary intersecting portions of the first and second grooves 52, 54. The ruptured surfaces 68 have a height equal to the entire thickness of the ferrite segment 60. The observatory analysis further reveals the presence of recess traces 44'a which correspond to the respective recesses 44' at the four corners of the ferrite segment 60 and which have a depth equal to the depth dimension of the first and second groove traces 52a, 54a.

Figure 17:
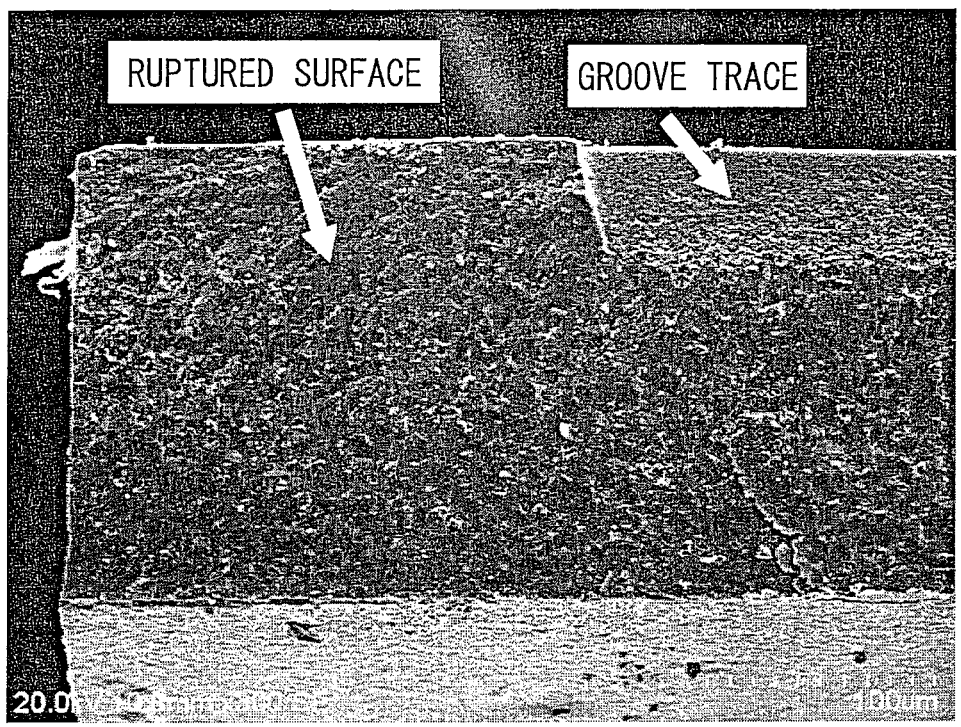
FIG. 17 is an electron microscopic photograph showing a state of rupture on an end face on one of four sides of the ferrite segment shown in FIG. 14.
Figure 18:
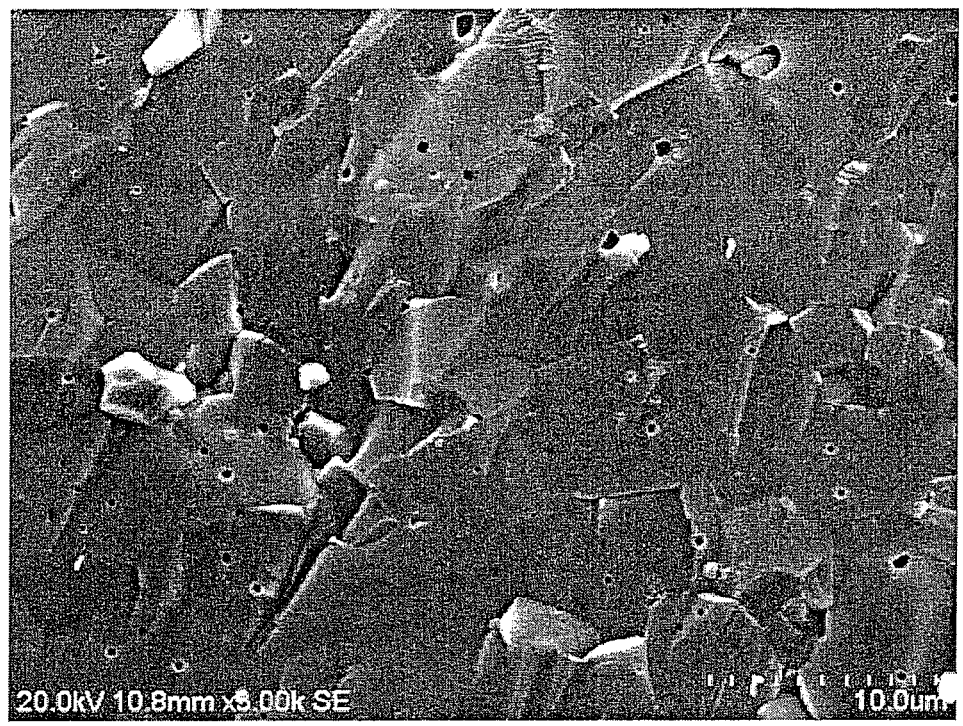
FIG. 18 is a scanning microscope photograph showing an enlarged ruptured surface shown in FIG. 17.
Figure 19:
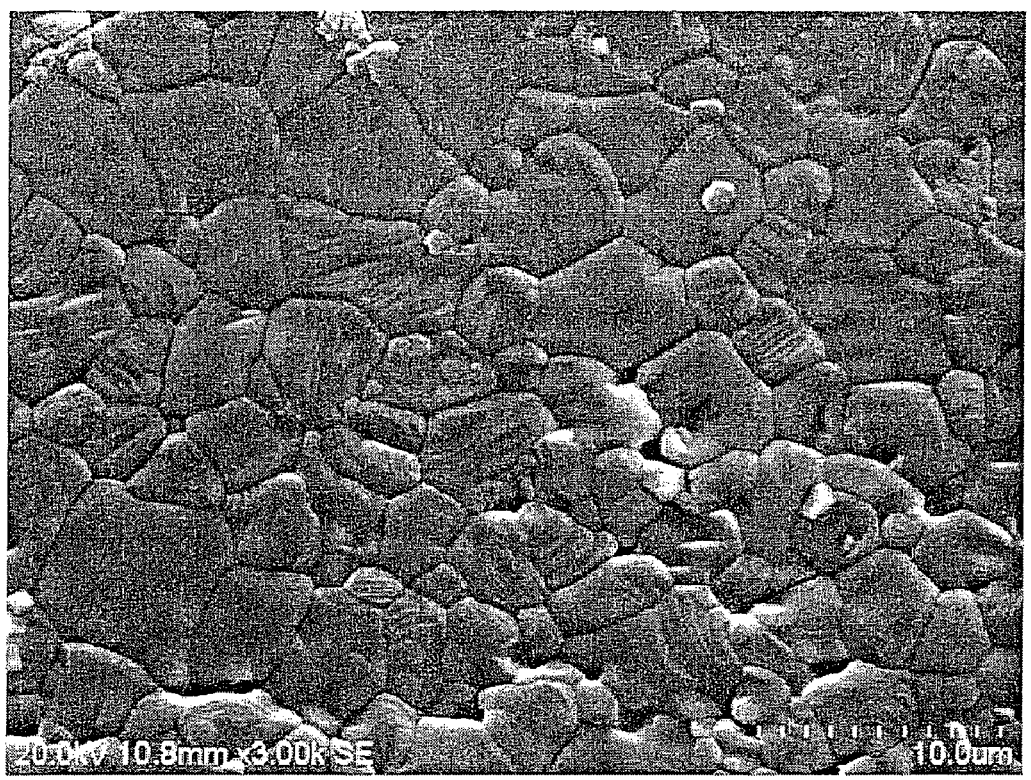
FIG. 19 is a scanning microscope photograph showing an enlarged groove shown in FIG. 17.

An observatory analysis by a scanning electron microscope of portions of the side faces of the ferrite segment 60 which are adjacent to one of the four corners (and which do not include the recess 44') reveals a difference in state between exposed surfaces of the traces 52a, 54a of the dividing grooves 52, 54, and the ruptured surfaces 64, 66 below the bottom of the dividing grooves 52, 54 and the ruptured surfaces 68 corresponding to the connecting portions 40', as is apparent from FIG. 17. The photograph of FIG. 18 taken by the scanning electron microscope shows in enlargement the ruptured surfaces 64, 68 shown in FIG. 17. However, a grain boundary of the ferrite crystal is not visible in the photograph of FIG. 18. On the other hand, in the photograph of FIG. 19 which is also taken by the scanning electron microscope and which shows the exposed surfaces of the first groove trace 52a and the second groove trace 54a, a grain boundary of the ferrite crystal is clearly visible. Thus, it will be clearly recognized that the surfaces shown in FIGS. 18 and 19 have different states.

In addition, the ruptured surfaces 68 corresponding to the connecting portion 40' are present at least one corner of each of the multiplicity of ferrite segments 60 constituting the ferrite layer of the composite ferrite sheet 62 according to this invention, such that the ruptured surfaces 68 covers the entire thickness of the ferrite segment 60. These ruptured surfaces 68 effectively prevent displacement of the adjacent ferrite segments 60 in a direction perpendicular to the plane of the ferrite segments 60, so that the composite ferrite sheet 62 can be adequately bonded to a flat surface of a desired electronic component, and also to a curved surface of a desired electronic component such that the outer surface of the double-coated adhesive sheet 58 is in contact with the curved surface.

While one typical embodiment of this invention has been described in detail, for illustrative purpose only, it is to be understood that the invention is not limited to the details of the illustrated embodiment.

In the illustrated embodiment, the pyramidal protrusion 18 is provided as the means for forming the rupture assisting portion, at each of the imaginary intersecting portions of the two kinds of protrusions 14, 16 in the groove forming die 10, so that the recess 44, 44' in the form of the inverted quadrangular pyramid is formed as the rupture assisting portion in the center of the connecting portions 40, 40' formed at each imaginary intersecting portion of the two kinds of grooves (36, 38; 52, 54) in the ferrite green sheet 34 or the sintered ferrite sheet 50. However, the pyramidal protrusion 18 provided as the means for forming the rupture assisting portion may be replaced by protrusions of various other shapes or configurations, such as a pyramidal shape other than the quadrangular pyramidal shape, and a conical shape. The provision of the protrusions of such various shapes as the means (18) for forming the rupture assisting portion permits eventual formation of the recesses (44') of the shape corresponding to the protrusions (18), in the center of the connecting portions 40' at each imaginary portion of the two kinds of dividing grooves 52, 54 of the sintered ferrite sheet 50.

Figure 20A:
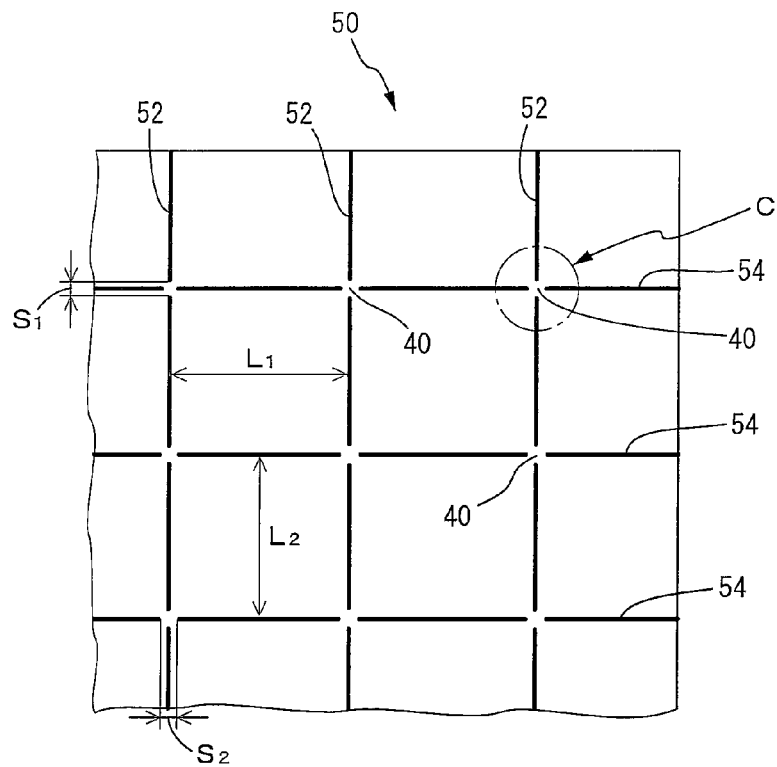
FIGS. 20A and 20B are illustrative views showing the surface of another example of a sintered ferrite sheet on which dividing grooves of two kinds are formed in a grid pattern according to this invention, FIG. 20A being a fragmentary illustrative plan view while FIG. 20B being an enlarged illustrative view of a portion C in FIG. 20A.
Figure 20B:
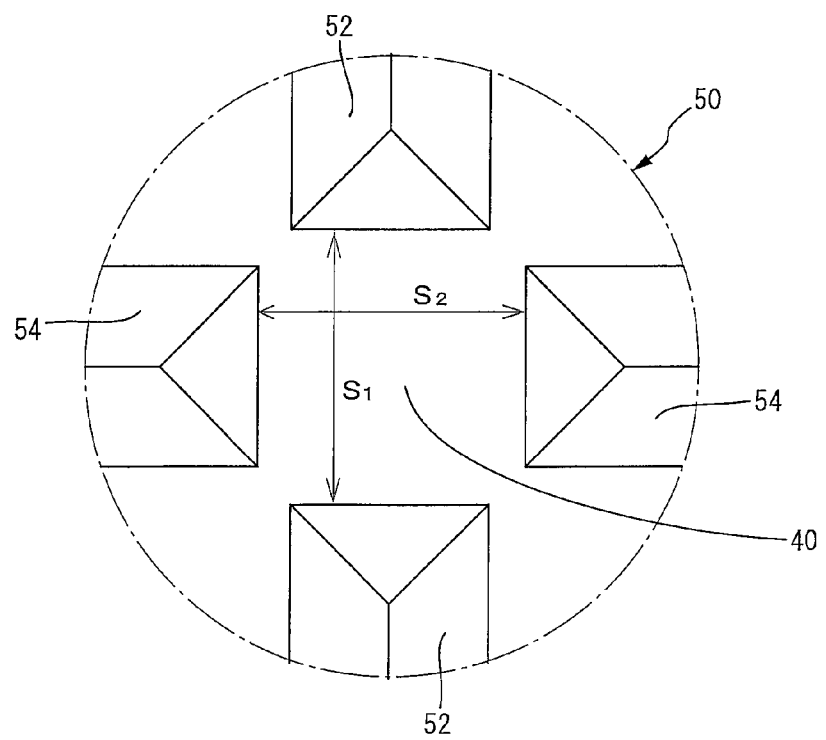

In the presence of the recesses 44' in the center of the connecting portions 40' at each imaginary intersecting portion of the two kinds of dividing grooves 52, 54 in the sintered ferrite sheet 50, the sintered ferrite sheet 50 can be advantageously divided at (ruptured or broken along) the first dividing grooves 52 and the second dividing grooves 54. However, the principle of this invention does not necessarily require the provision of the means (18) for forming the rupture assisting portions at the imaginary intersecting portions of the two kinds of protrusions 14, 16 on the groove forming die 10. In this case, a flat connecting portion 40' is formed at each imaginary intersecting portion of the two kinds of dividing grooves 52, 54 of the sintered ferrite sheet 50, without formation of the recess (44') at the imaginary intersecting portion, as shown in FIGS. 20A and 20B.

While the two kinds of grooves (36, 38; 52, 54) are preferably formed in only one of the opposite major surfaces of the ferrite green sheet 34 and the sintered ferrite sheet 50, from the standpoint of productivity of the composite ferrite sheet 62, those grooves may be formed in both of the opposite major surfaces of the sheets 34, 50. Further, it is possible that one kind of grooves (36; 52) is formed in one of the opposite major surfaces of the sheet 34, 50, while the other kind of grooves (38; 54) is formed in the other major surface of the sheet 34, 50. In this case where the two kinds of grooves are formed in the respective opposite major surfaces of the sheet 34, 50, the two kinds of grooves are required to be formed so as to cooperate with each other to form a grid pattern as spatially seen in the direction perpendicular to the opposite major surfaces.

In the illustrated embodiment, the protrusions 14 of one kind formed in the groove forming die 10, the grooves 36 of one kind formed in the grooved ferrite green sheet 42, and the dividing grooves 52 of one kind formed in the sintered ferrite sheet 50 are equally spaced apart from each other in the extending direction of the other kind of protrusions 16, grooves 38 and dividing grooves 54. Similarly, the protrusions 16 of the other kind, the grooves 38 of the other kind, and the dividing grooves 54 of the other kind are equally spaced apart from each other in the extending direction of the above-indicated kind of protrusions 14, grooves 36 and dividing grooves 52. Accordingly, each of the ferrite segments 60 obtained by dividing the sintered ferrite sheet 50 has square opposite major surfaces the four sides of which have the same length. However, the spacing distance of the protrusions 14, grooves 36 and dividing grooves 52 and the spacing distance of the protrusions 16, grooves 38 and dividing grooves 54 may be different from each other, so that the opposite major surfaces of each ferrite segment (60) have a rectangular shape other than the square. Further, the spacing distance of the protrusions and grooves in one or both of the two mutually perpendicular directions may vary in the direction perpendicular to the extending direction of the protrusions and grooves. The spacing distance ($L_1$ indicated in FIG. 20A) of the first dividing grooves 52 and the spacing distance ($L_2$ also indicated in FIG. 20A) of the second dividing grooves 54 are selected generally within a range of 0.1 to 5 mm, preferably within a range of 1 to 3 mm.

In the illustrated embodiment, the first dividing grooves 52 and the second dividing grooves 54 of the sintered ferrite sheet 50 are discontinuous at the imaginary intersecting portions, namely, each groove 52, 54 has a plurality of divisions which are spaced apart from each other in the extending direction of the groove 52, 54. When a spacing distance between the adjacent divisions is excessively long, lines of breakage or rupture of the sintered ferrite sheet 50 into, the ferrite segments 60 which are substantially parallel to the dividing grooves 52, 54 may not accurately pass the center of the connecting portions 40'. In view of this drawback, the spacing distance $S_1$ between the adjacent divisions of the first dividing grooves 52 and the spacing distance $S_2$ between the adjacent divisions of the second dividing grooves 54 are preferably selected to be not longer than $0.2 \times L_2$ (spacing distance of the second dividing grooves 54), and not longer than $0.2 \times L_1$ (spacing distance of the first dividing grooves 52), respectively. The lower limits of the spacing distances $S_1$, $S_2$ are preferably determined to avoid mutual contiguity of the two kinds of grooves 52, 54, and are therefore preferably determined to be larger than the width of the first dividing grooves 52 and the width of the second dividing grooves 54 as measured at the opening of the dividing grooves 52, 54.

Figure 21A:
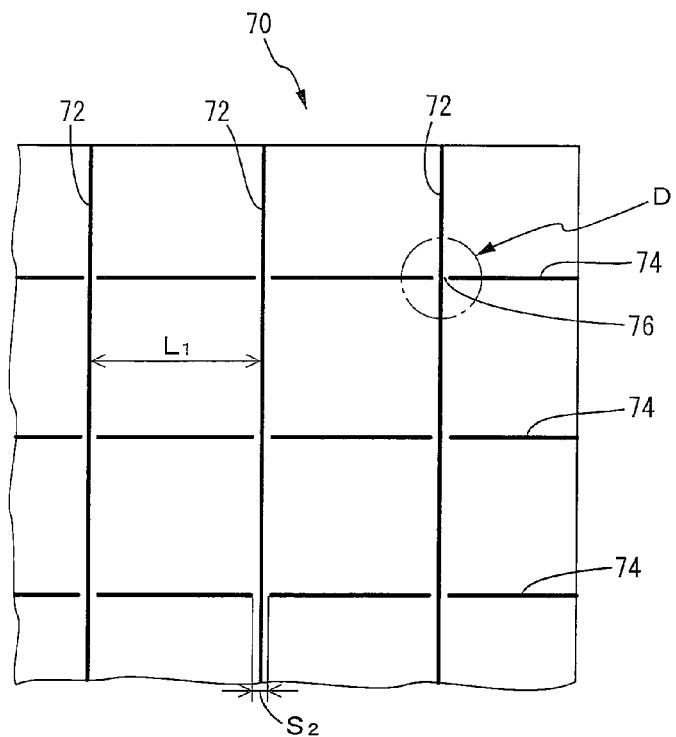
FIGS. 21A and 21B are illustrative views showing the surface of a further example of a sintered ferrite sheet on which the dividing grooves of two kinds are formed in a grid pattern in accordance with the invention, FIG. 21A being a fragmentary illustrative plan view while FIG. 20B being an enlarged illustrative view of a portion D in FIG. 21A.
Figure 21B:
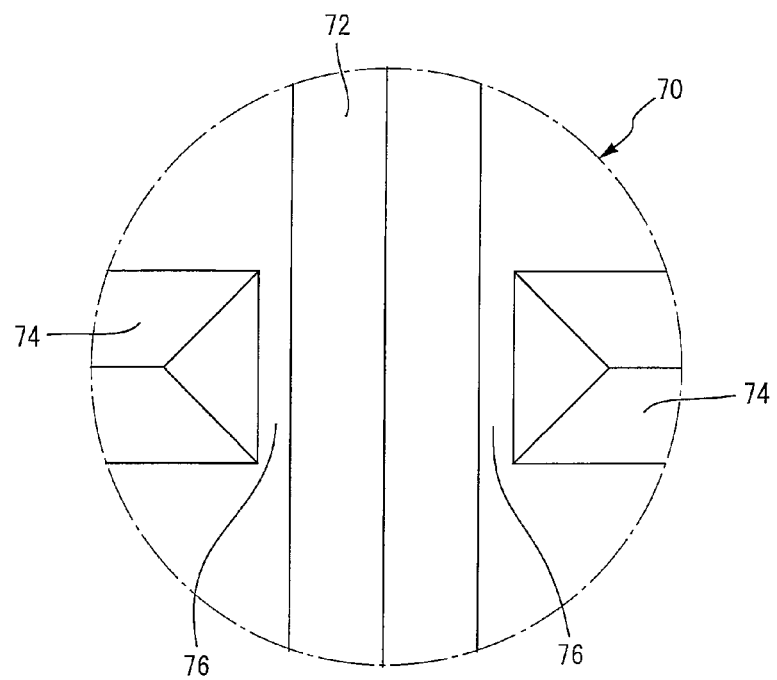

Although the illustrated embodiment is configured such that the two kinds of dividing grooves 52, 54 are both discontinuous at the imaginary intersecting portions, the dividing grooves of only one of the two kinds may be discontinuous at the imaginary intersecting portions. One example of this modification is shown in FIGS. 21A and 21B, in which a sintered ferrite sheet 70 has first dividing grooves 72 which has V-shaped cross section and which are formed continuously so as to extend from one of opposite side faces of a sintered ferrite sheet 70 toward the other side face, and second dividing grooves 74 which extend in the direction perpendicular to the extending direction of the first dividing grooves 72 and which are discontinuous at each position at which the first dividing grooves 72 intersect the extension line of the second dividing grooves 74. Namely, each of the second dividing grooves 74 consists of a plurality of divisions spaced apart from each other by a distance shorter than the spacing distance (L1) of the first dividing grooves 72, and the adjacent divisions of each second dividing groove 74 are located on the respective opposite sides (right and left sides as seen in FIG. 21A) of the corresponding first dividing groove 72, with a suitable spacing distance with respect to the first dividing groove 72, so that connecting portions 76 are formed between each first dividing groove 72 and the adjacent divisions of each second dividing groove 74.

The sintered ferrite sheet 70 in which only the second dividing grooves 74 are formed discontinuously is preferably divided into ferrite segments, by first dividing the sintered ferrite sheet 70 at the first dividing grooves 72 into a plurality of strips. Described more specifically, a roller is positioned relative to the sintered ferrite sheet 70 such that an axis of rotation of the roller is parallel to the extending direction of the first dividing grooves 72, and the roller is rolled in pressing contact with the sintered ferrite sheet 70, in the extending direction of the second dividing grooves 74 (in the left and right direction as seen in FIG. 21A), to divide the sintered ferrite sheet 70 at the first dividing grooves 72 into the plurality of strips. Then, a roller having an axis of rotation parallel to the extending direction of the second dividing grooves 74 is rolled in pressing contact with the plurality of strips, in the extending direction of the first dividing grooves 72 (in the vertical direction as seen in FIG. 21A), to divide each strips at the second dividing grooves 74 into a multiplicity of ferrite segments which cooperate with each other to form a planar ferrite layer of a desired composite ferrite sheet.

Figure 22A:
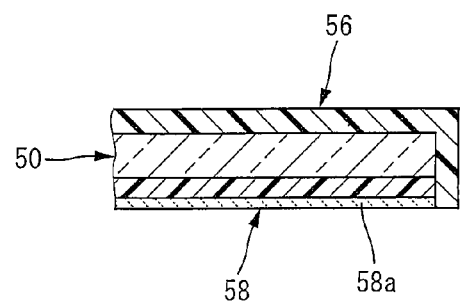
FIGS. 22A, 22B, 22C and 22D are illustrative cross sectional views showing respective different states of covering of side faces of the sintered ferrite sheet with supporting sheets, FIGS. 22A and 22C being the illustrative cross sectional views showing respective different states of protection of an end face with a single-coated adhesive sheet used as one of the supporting sheets, while FIGS. 22B and 22D being the illustrative cross sectional views showing respective different states showing respective different states of coating of the end face of the sintered ferrite sheet with a double-coated adhesive sheet used as the other supporting sheet.
Figure 22B:
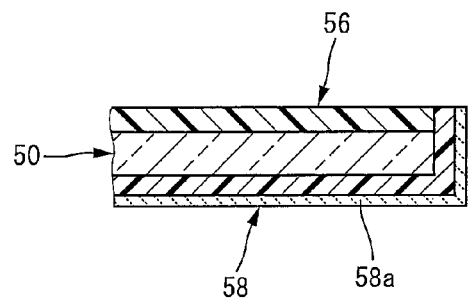
Figure 22C:
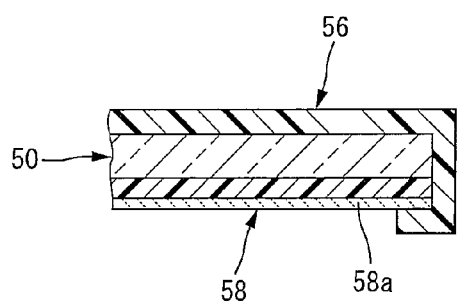
Figure 22D:
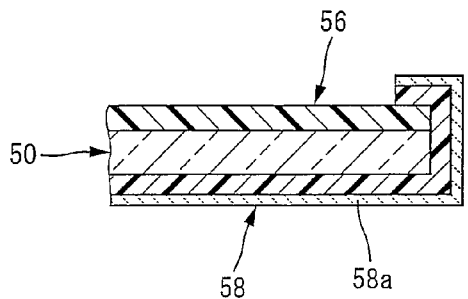
Figure 23:
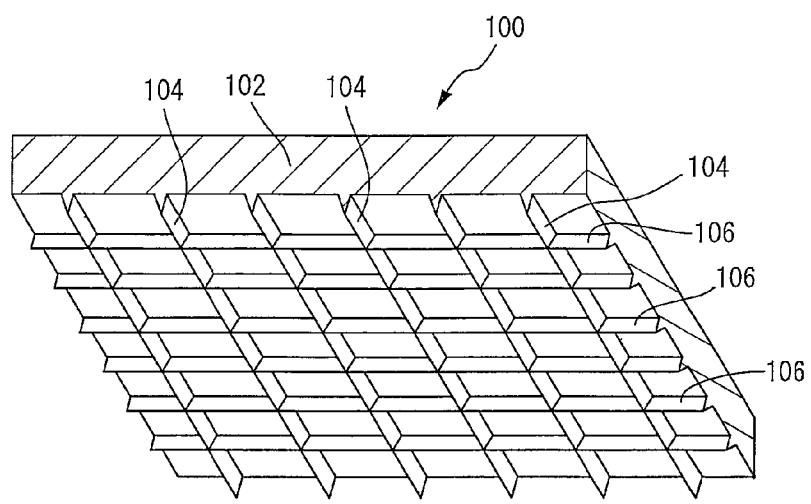
FIG. 23 is an illustrative perspective view showing one example of a groove forming die used in the fabrication of a resistor in the form of a chip.
Figure 24:
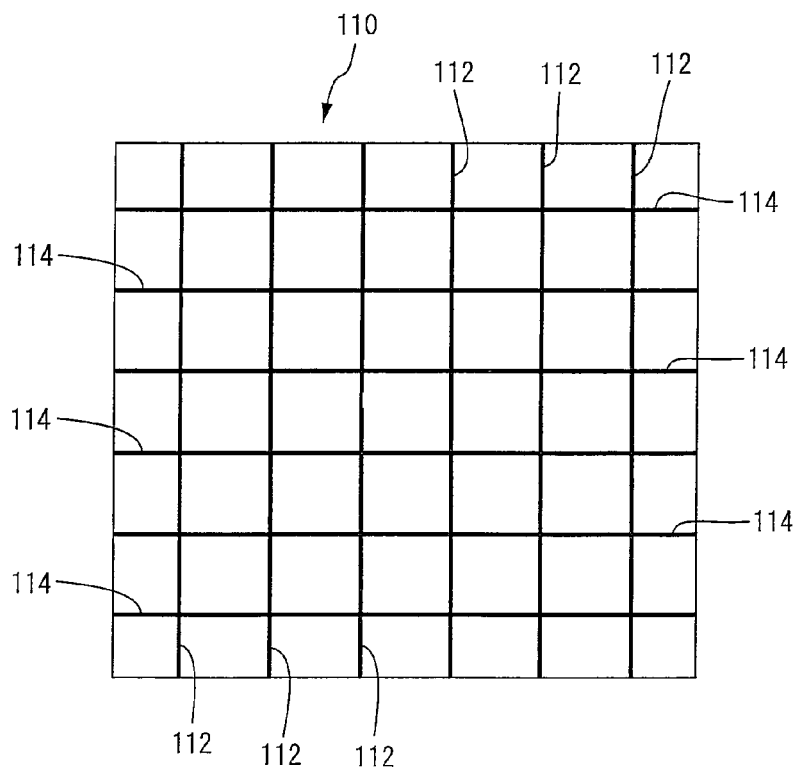
FIG. 24 is an illustrative plan view showing a surface of a grooved green sheet formed by using the groove forming die shown in FIG. 23, in which grooves are formed.

In the illustrated embodiment, the laminated sheet 48 is fabricated by bonding the single-coated adhesive sheet 56 and the double-coating adhesive sheet 58 to the sintered ferrite sheet 50, as the supporting sheets for supporting and protecting the sintered ferrite sheet 50. However, only one of the adhesive sheets 56, 58 may be bonded to the sintered ferrite sheet 50 to fabricate the laminated sheet (48). Further, the size of the supporting sheets (56, 58) may be made slightly larger than the size of the opposite major surfaces of the sintered ferrite sheet 50 so that the peripheral portions of the supporting sheets which extend outwardly from the side faces of the sintered ferrite sheet 50 can be folded to be bonded to and to cover the side faces, for thereby effectively protecting the side faces of the sintered ferrite sheet 50, to advantageously prevent chipping of the side faces or other problems. FIGS. 22A to 22D show different examples of protection of the side faces of the sintered ferrite sheet 50 by the supporting sheets (56, 58). FIGS. 22A and 22B show the examples in which the single-coated adhesive sheet 56 or double-coated adhesive sheet 58 is folded at its peripheral portion to cover one side face of the sintered ferrite sheet 50, while FIGS. 22C and 22D show the examples in which the single-coated adhesive sheet 56 or double-coated adhesive sheet 58 is folded at its peripheral portion to cover not only one side face of the sintered ferrite sheet 50, but also a peripheral portion of the major surface of the sintered ferrite sheet 50 which is opposite to the major surface which is entirely covered by the adhesive sheet 56, 58.

It is needless to confirm that the present invention may be embodied with various other changes, modifications and improvements, which may occur to those skilled in the art, without departing from the spirit of the invention.

What is claimed is:

1. An array of sintered ferrite segments each having a rectangular and planar shape that is obtained from a sintered ferrite sheet including a plurality of first dividing grooves having V-shaped cross sections and a plurality of second dividing grooves having V-shaped cross sections, which first and second dividing grooves cooperate with each other to form a grid pattern, each dividing groove of at least one of the plurality of first dividing grooves and the plurality of second dividing grooves having a discontinuous region at each imaginary intersecting portion at which an extension line of the first dividing grooves and an extension line of the second dividing grooves intersect each other, the sintered ferrite sheet being ruptured along the first dividing grooves and the second dividing grooves, into the sintered ferrite segments, wherein at least one side face of each of the sintered ferrite segments includes at least one ruptured section that is ruptured over an entire thickness of the sintered ferrite segment at least one end portion in an extending direction of one of the first dividing groove and the second dividing groove, wherein a length of the discontinuous region in the first dividing grooves is $S_1$, a length of the discontinuous region in the second dividing grooves is $S_2$, adjacent first dividing grooves are spaced apart from one another by a length $L_1$, and adjacent second dividing grooves are spaced apart from one another by a length $L_2$, and wherein $S_1 \leqq 0.2 \times L_2$ and $S_2 \leqq 0.2 \times L_1$.

2. An array of sintered ferrite segments having rectangular and planar shape that is obtained from a sintered ferrite sheet having a plurality of first dividing grooves having V-shaped cross sections and a plurality of second dividing grooves having V-shaped cross sections, which first and second dividing grooves cooperate with each other to form a grid pattern, each dividing groove of both of the plurality of first dividing grooves and the plurality of second dividing grooves having a discontinuous region at each imaginary intersecting portion at which an extension line of the first dividing grooves and an extension line of the second dividing grooves intersect each other, the sintered ferrite sheet further having a rupture assisting portion in the form of a recess formed by a pyramidal protrusion formed on a die used for forming the sintered ferrite sheet at the imaginary intersecting portion, the sintered ferrite sheet being ruptured along the first dividing grooves and the second dividing grooves, into the sintered ferrite segments, wherein at least one side face of each of the sintered ferrite segments includes at least one ruptured section that is ruptured over an entire thickness of the sintered ferrite segment, except for a portion corresponding to the rupture assisting portion, at at least one end portion in an extending direction of one of the first dividing groove and the second dividing groove, wherein a length of the discontinuous region in the first dividing grooves is $S_1$, a length of the discontinuous region in the second dividing grooves is $S_2$, adjacent first dividing grooves are spaced apart from one another by a length $L_1$, and adjacent second dividing grooves are spaced apart from one another by a length $L_2$, and wherein $S_1 \leqq 0.2 \times L_2$ and $S_2 \leqq 0.2 \times L_1$.

3. A composite ferrite sheet comprising an array of sintered ferrite segments as defined in claim 1 and at least one flexible supporting sheet, wherein the sintered ferrite segments are arranged in mutually perpendicular two directions, and the at least one flexible supporting sheet is bonded to at least one of opposite major surfaces of each of the sintered ferrite segments such that adjacent ones of the sintered ferrite segments are butted together so as to form a grid pattern.

4. A composite ferrite sheet comprising an array of sintered ferrite segments as defined in claim 2 and at least one flexible supporting sheet, wherein the sintered ferrite segments are arranged in mutually perpendicular two directions, and the at least one flexible supporting sheet is bonded to at least one of opposite major surfaces of each of the sintered ferrite segments such that adjacent ones of the sintered ferrite segments are butted together so as to form a grid pattern.

5. The array of claim 1, wherein the sintered ferrite segments have a square and planar shape.

6. The array of claim 2, wherein the sintered ferrite segments have a square and planar shape.

* * * * *